US010279541B2

(12) United States Patent
Tomuta

(10) Patent No.: US 10,279,541 B2
(45) Date of Patent: May 7, 2019

(54) SYSTEMS AND METHODS FOR ADDITIVE MANUFACTURING PROCESSES

(71) Applicant: The Boeing Company, Chicago, IL (US)

(72) Inventor: Raul Tomuta, Stanton, CA (US)

(73) Assignee: THE BOEING COMPANY, Chicago, IL (US)

( * ) Notice: Subject to any disclaimer, the term of this patent is extended or adjusted under 35 U.S.C. 154(b) by 469 days.

(21) Appl. No.: 14/752,290

(22) Filed: Jun. 26, 2015

(65) Prior Publication Data

US 2016/0375635 A1    Dec. 29, 2016

(51) Int. Cl.
| | |
|---|---|
| *B29C 64/10* | (2017.01) |
| *B29C 64/106* | (2017.01) |
| *B33Y 80/00* | (2015.01) |
| *B33Y 10/00* | (2015.01) |
| *B29C 64/386* | (2017.01) |
| *B29C 70/00* | (2006.01) |
| *B33Y 30/00* | (2015.01) |
| *B33Y 50/02* | (2015.01) |
| *B29K 55/02* | (2006.01) |

(52) U.S. Cl.
CPC .......... *B29C 64/106* (2017.08); *B29C 64/386* (2017.08); *B33Y 10/00* (2014.12); *B33Y 80/00* (2014.12); *B29C 70/00* (2013.01); *B29K 2055/02* (2013.01); *B33Y 30/00* (2014.12); *B33Y 50/02* (2014.12)

(58) Field of Classification Search
None
See application file for complete search history.

(56) References Cited

U.S. PATENT DOCUMENTS

| | | |
|---|---|---|
| 6,934,600 B2 | 8/2005 | Jang et al. |
| 2003/0186042 A1 | 10/2003 | Dunlap et al. |
| 2013/0056672 A1 | 3/2013 | Johnston et al. |
| 2014/0291886 A1 | 10/2014 | Mark et al. |

FOREIGN PATENT DOCUMENTS

WO    WO 2015/091726    6/2015

*Primary Examiner* — Edmund H Lee
(74) *Attorney, Agent, or Firm* — Haynes and Boone, LLP

(57) ABSTRACT

Techniques are disclosed for additive manufacturing systems and methods to form reinforced additive manufactured objects. A method for forming a reinforced additive manufactured object includes forming a first structural layer with a first void that extends partially through the first structural layer, forming a second structural layer with a second void that extends fully through the second structural layer to a border between the first structural layer and the second structural layer, where the first void and the second void align to form a cross-load void across the border between the first and second structural layers, and filling the cross-load void with a reinforcing material to form a cross-load member.

20 Claims, 13 Drawing Sheets

SYSTEMS AND METHODS FOR ADDITIVE MANUFACTURING PROCESSES

TECHNICAL FIELD

The present invention relates generally to object formation and, more particularly, to the formation of additive manufactured objects.

BACKGROUND

Manufacturing tools, adapters, building blocks, and/or other useful objects can involve an additive manufacturing process. Many additive manufacturing processes involve forming multiple layers of materials on top of one another. For example, some additive manufacturing processes include forming multiple layers of light-sensitive materials, where each layer or portion of the layer is formed into a pattern and exposed to a light to cure or solidify the layer and/or pattern before additional layers are formed. Some additive manufacturing processes involve forming multiple layers of a liquid, where each layer is formed by dispensing the liquid into a pattern and exposing the liquid/pattern to an ultraviolet laser to cure and solidify the exposed liquid and/or join the layer to prior layers beneath it. Other additive manufacturing processes may be formed using heat and ambient temperatures to soften and/or cure materials to form the layers and/or patterns. Layer by layer, such additive manufacturing processes may be used to build objects with various shapes, forms, and/or sub-structures, which may range in complexity from a simple mechanical screw or washer to an entire automobile.

In general, various types of additive manufacturing processes, possibly including a combination of computer design and robotics, may be used to build multi-dimensional objects. Some conventional additive manufacturing processes may produce objects having structural anomalies associated with the type of additive manufacturing process or material used to form the objects. Conventional attempts to reduce such structural anomalies (e.g., by using different materials requiring relatively extreme curing temperatures and/or exposures, or by requiring higher precision robotic actuators) may be relatively expensive and/or complex. Thus, there is a need for improved additive manufacturing processes, systems, and designs, for example, in the area of 3D printing.

SUMMARY

Techniques are disclosed for additive manufacturing systems and methods to provide reinforced structural layers in a multi-dimensional additive manufactured object. An additive manufacturing system may include a controller configured to supply a nozzle with materials to form structural layers of a multi-dimensional additive manufactured object, where each structural layer is formed from a group of one or more sublayers designated as the structural layer in order to facilitate reinforcement of the additive manufactured object and according to an overall design of the additive manufactured object, as described herein. The structural layers may be successively formed on top and/or otherwise adjacent to one another. Further, the structural layers may be formed to include a number of voids that extend partially or fully through the structural layers to form cross-load voids across borders between the structural layers. As such, the cross-load voids may be filled with reinforcing materials to form cross-load members across the borders to strengthen, support, and/or reinforce the structural layers in the additive manufactured object.

In one embodiment, a method may include forming a first structural layer including a void that extends partially through the first structural layer; forming a second structural layer including a void that extends fully through the second structural layer to a border located between the first structural layer and the second structural layer, where the void of the first structural layer and the void of the second structural layer align to form a cross-load void across the border between the first structural layer and the second structural layer; and filling the cross-load void with a material to form a cross-load member.

In another embodiment, an additive manufacturing system may include an additive manufacturing apparatus and a logic device configured to control the additive manufacturing apparatus to: form a first structural layer including a first void that extends partially through the first structural layer; form a second structural layer including a second void that extends fully through the second structural layer to a border between the first structural layer and the second structural layer, where the first void and the second void align to form a cross-load void across the border between the first and second structural layers; and fill the cross-load void with a reinforcing material to form a cross-load member.

In a further embodiment, a method may include receiving a command to form an additive manufactured object (e.g., fused filament fabrication (FFF)) object); determining a first structural layer of the additive manufactured object including a first void that extends through the first structural layer; and determining a second structural layer of the additive manufactured object including a second void that extends through the second structural layer to a border between the first structural layer and the second structural layer, where the first void and the second void align to form a cross-load void across the border between the first and second structural layers.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like devices illustrated in one or more of the figures.

DETAILED DESCRIPTION

Figure 1A:
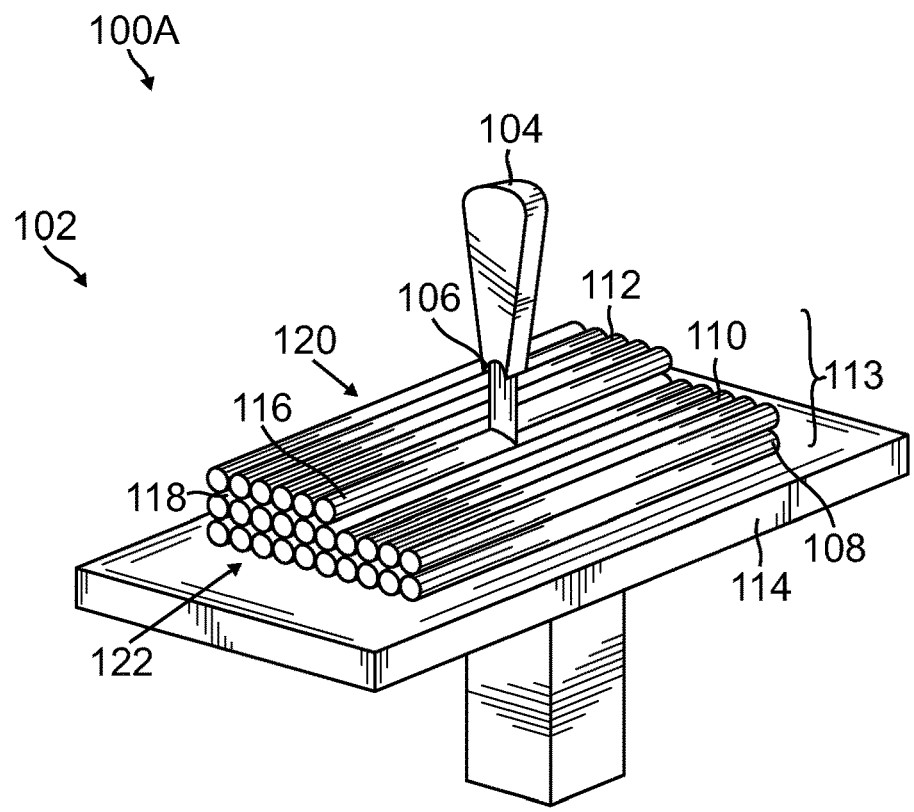
FIG. 1A illustrates a diagram of an additive manufacturing apparatus for forming a multi-dimensional additive manufactured object in accordance with an embodiment of the disclosure.

In accordance with various embodiments of the present disclosure, techniques are disclosed for additive manufacturing systems and methods to provide reinforced structural layers in a multi-dimensional additive manufactured object. An additive manufacturing system, such as a three dimensional (3D) printer system, may include a logic device configured to use the additive manufacturing system to form structural layers of a multi-dimensional additive manufactured object. The structural layers may be successively formed on top of one another and/or otherwise adjacent to one another. Further, the structural layers may be formed to include a number of aligned voids that extend partially or fully through the structural layers to form cross-load voids across borders between the structural layers. The cross-load voids may be filled with reinforcing materials to form cross-load members across the borders to strengthen, support, and/or reinforce the structural layers in the additive manufactured object. The shape, number, distribution, and/or other characteristics of the cross-load voids, and therein the cross-load members, may be selected and/or adjusted to provide strength, support, and/or reinforcement specifically suited for the expected loads on the multi-dimensional additive manufactured object.

Various additive manufacturing processes involve heating certain materials to make them pliable enough to form sublayers, structural layers, and/or other structures of an additive manufactured object, for example, and/or to make the structures adhere to each other to form the additive manufactured object. For example, some additive manufacturing processes may involve heating, softening, and/or melting material to form the sublayers, which may be combined to form the structural layers (e.g., structures including multiple sublayers). In other embodiments, additive manufacturing processes may involve the use of focused heat (e.g., lasers) to selectively or directly melt certain materials to form the sublayers and/or structural layers. The materials may range from elemental metals, alloys, metal or plastic powders, plasters, photopolymers, and/or other materials that can be reliably formed into sublayers and/or other structures using heat.

Some additive manufacturing processes, sometimes referred to generally as fused filament fabrication (FFF), may involve an extrusion process. In such extrusion processes, material is heated and forced, pushed, and/or pulled through one or more nozzles, which are used to pattern the material into a shape or structure used to form an additive manufactured object. For example, a nozzle with a selected cross-sectional shaped and/or sized opening may be heated sufficiently to soften or melt the material, thereby allowing the material to be forced and/or pushed through the opening with a selected shape and/or size. Using such nozzles, many different types of additive manufactured objects, each with a variety of different physical, characteristics, may be formed with varying levels of complexities. In addition, the embodiments described herein may apply and/or be adapted to various other types of additive manufacturing processes such as stereolithography, laser sintering, and/or electron beam melting.

FIG. 1A illustrates a diagram of additive manufacturing apparatus 100A in accordance with an embodiment of the disclosure. As shown in FIG. 1A, additive manufacturing apparatus 100A includes extruder 104 and nozzle 106. Nozzle 106 may have a circular cross-sectional opening or orifice, where extrusions 116 exit or pass through nozzle 106. As shown, extruder 104 and nozzle 106 are used to form a number of individual sublayers 108, 110, and 112 of additive manufactured object 102 on platform 114. Sublayers 108, 110, and 112, also referred to as extrusion layers, may be formed by materials passing through extruder 104 for discharge from nozzle 106. As such, extrusion set 113, including sublayers 108, 110, and 112, may also be referred to as a partially formed structural layer. In some embodiments, sublayers 108, 110, and 112 may be formed from extrusions 116 having a thickness ranging from approximately 0.1 mm to 0.3 mm. In other embodiments, the thickness of extrusions 116 may be much larger, such as between 0.3 mm and 1 cm, for example.

During the extrusion process, cylindrical rods or wires of materials such as those described above may be wound in a coil to supply the material to extruder 104. Nozzle 106 may heat the material, to melt or soften the material, thereby causing it to flow out of nozzle 106 with a particular shape and/or size. The material may then harden (e.g., immediately, or after a relatively short period of time) to form sublayers 108, 110, and 112. In some instances, sublayers 108, 110, and 112 may be cured or hardened over time based on the type of material used during the extrusion process, the amount of heat applied to nozzle 106, the ambient temperature of the air surrounding sublayers 108, 110, and 112, and/or other factors related to the material and/or the environment. Additive manufacturing apparatus 100A may control the flow of the material based on the amount of heat applied to nozzle 106 and/or the amount of material supplied to extruder 104. In some embodiments, a stepper motor or a servo motor may be configured to control the position and/or the movement of extruder 104 and nozzle 106. In other embodiments, one or more of such motors may be used to move platform 114, thereby keeping extruder 104 and nozzle 106 stationary during the extrusion processes.

As illustrated, the first layer on platform 114 is shown as sublayer 108. The second layer on top of sublayer 108 is shown as sublayer 110. The third layer on top of sublayer 110 is shown as sublayer 112. Further, each of sublayer 108, 110, and 112 may be formed with a number of tubular shaped extrusions 116 formed by the circular cross-sectional opening and/or orifice of nozzle 106. In addition, nozzle 106 is shown in the process of depositing extrusion 116 of sublayer 112. It should be noted that each of sublayers 108, 110, and 112 may also be formed with other nozzles to form extrusions of other shapes, sizes, geometries, and/or complexities, among various other aspects of the layers. Sublayers 108, 110, and 112 may also be formed with a variety of materials. In some instances, the materials may include metals, alloys, plastics (e.g., thermoplastics), rubber, clay, ceramics, porcelain, silicone, food, and/or composites of these materials. In addition, sublayers 108, 110, and 112 may be formed using other types of materials including polymers such as acrylonitrile butadiene styrene (ABS), polycarbonate (PC), polylactic acid (PLA), high density polyethylene (HDPE), PC/ABS, polyphenylsulfone (PPSU), and high impact polystyrene (HIPS), filaments fabricated from resins, and/or other types of extrusion materials.

As shown, extrusions 116 in sublayers 108, 110, and 112 may create rows of gaps defined between adjacent extrusions. For example, gap 118 is shown between sublayers 108 and 110. In some instances, such gaps 118 may create anomalies in sublayers 108, 110, and 112. For example, consider a scenario where there may be one or more force vectors 120 and 122 applied to additive manufactured object 102. In such instances, sublayers 108, 110, and 112 may be relatively weak with respect to force vector 120 oriented perpendicular to a length of sublayers 108, 110, and 112, as compared to force vector 122 parallel to the length of sublayers 108, 110, and 112. In some instances, force vector 120 may cause individual extrusions 116 to separate or peel away from one or more of sublayers 108, 110, and 112.

Figure 1B:
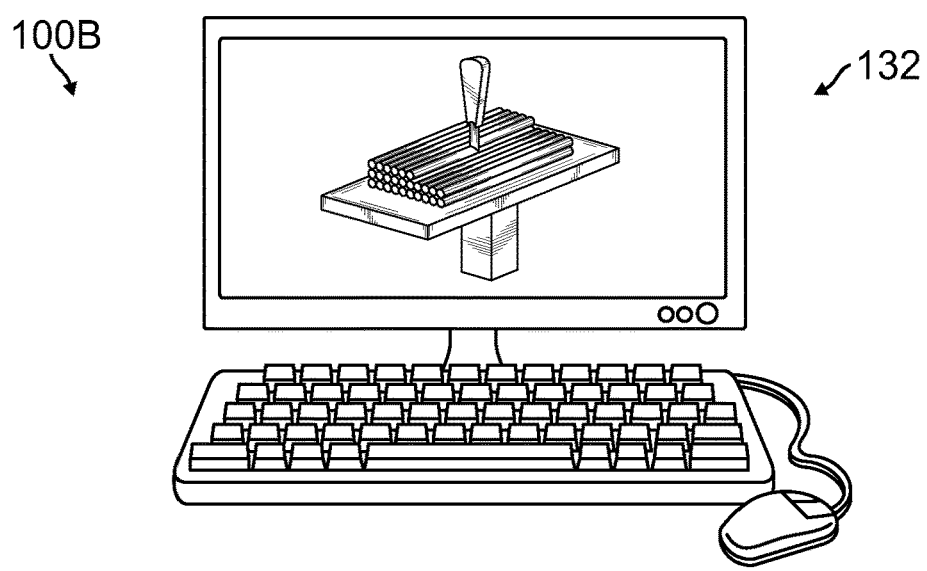
FIG. 1B illustrates a diagram of an additive manufacturing system for forming a multi-dimensional additive manufactured object in accordance with an embodiment of the disclosure.

FIG. 1B illustrates a diagram of additive manufacturing system 100E in accordance with an embodiment of the disclosure. As shown in FIG. 1B, additive manufacturing system 100B includes additive manufacturing apparatus 100A described above in FIG. 1A. Further, additive manufacturing system 100B includes logic device 132 (e.g., a computer and/or computing device) configured to receive user input. For example, the user input may describe additive manufactured object 102, force vectors 120, 122, and/or other characteristics of additive manufactured object 102, and to model or determine the sublayers 108, 110, and 112 of additive manufactured object 102 based on characteristics of extruder 104, nozzle 106, and/or additive manufacturing apparatus 100A. In some embodiments, additive manufacturing system 100B may be implemented as a multi-dimensional modeling system used to create a model of additive manufactured object 102 comprising sublayers 108, 110, and 112 and/or structural layers formed from sublayers 108, 110, and 112.

In various embodiments, one or more sublayers 108, 110, and 112 of additive manufactured object 102 may be grouped into extrusion set 113 of additive manufactured object 102, as described herein. Extrusion set 113 may be formed according to spatial characteristics of additive manufactured object 102 (e.g., according to relatively continuous borders between substructures in additive manufactured object 102, such as at corners and/or other discontinuities in shape, material, and/or other characteristics of additive manufactured object 102) for example, and/or may be determined based on a spatial distribution across additive manufactured object 102. Further, extrusion set 113, possibly a partially formed extrusion layer, may be segregated from other partially formed extrusion layers and reliably reinforced with additive manufactured object 102 using embodiments of the present disclosure, as described herein. For example, logic device 132 may be configured to virtually form sublayers 108, 110, and/or 112 of additive manufactured object 102 in a multi-dimensional space and virtually group portions of sublayers 108, 110, and/or 112 (e.g., defined at borders between sublayers and/or extrusions) into extrusion set 113 that is thick enough to allow one or more cross-load members to be formed across the structural layers, as described herein.

In some instances, logic device 132 may include a computer aided design (CAD) system, a 3D computer graphics and/or modeling system, a photogrammetry system, a mechanical design automation (MDA) system, and/or other types of 3D modeling systems. Various types of such systems may be used in the modification, analysis, and/or the optimizations of multi-dimensional additive manufactured objects. Further, in some instances, various layers in an additive manufactured object maybe stored in a file format native to the type of 3D modeling software, possibly also referred to as standard tessellation language (STL) file format. Logic device 132 may also be configured to control one or more of the components illustrated in FIG. 1A. For example, logic device 132 may be configured to model sublayers 108, 110, and 112 as shown in FIG. 1B and/or to generate instructions to control extruder 104, nozzle 106, and/or platform 114, to form sublayers 108, 110, and 112 as shown in FIG. 1A. In particular, logic device 132 may be configured to control movements of and/or control the temperature of extruder 104, nozzle 106, and/or platform 114 to form sublayers 108, 110, and 112 during one or more extrusion processes as described above. More generally, logic device 132 may be implemented to perform any of the processes described herein, and may be implemented with non-transitory memory configured to store executable instructions to control additive manufacturing apparatus 100A to perform the processes described herein.

In some embodiments, logic device 132 may receive one or more commands (e.g., from a user interface, such as a mouse or keyboard) to form an additive manufactured object. For example, logic device 132 may receive such commands to form a shape, a structure, an outline, a profile, and/or a figure of an additive manufactured object. Based on such commands, logic device 132 may determine one or more structural layers and/or sublayers 108, 110, and/or 112 forming such structural layers. In particular, logic device 132 may determine a shape, a height, a length, a width, and/or other characteristics of such structural layers and/or sublayers 108, 110, and/or 112. Further, logic device 132 may determine one or more materials that may be used to form structural layers and/or sublayers 108, 110, and/or 112. Yet further, logic device 132 may receive indications of expected force vectors 120 and/or 122, possibly as part of a command to form additive manufactured object 102. As such, logic device 132 may determine various characteristics of structural layers and/or sublayers 108, 110, and/or 112 of additive manufactured object 102 based on expected force vectors 120 and/or 122. In some instances, logic device 132 may determine one or more susceptible or relatively weak portions of additive manufactured object 102, which may be based, at least in part, on expected force vectors 120 and/or 122 and/or a shape of additive manufactured object 102. As such, based on identified susceptible or weak portions, logic device 132 may determine the shape, material, and/or other characteristics of structural layers and/or sublayers 108, 110, and/or 112 to reinforce the structural stability of additive manufactured object 102.

Figure 2A:
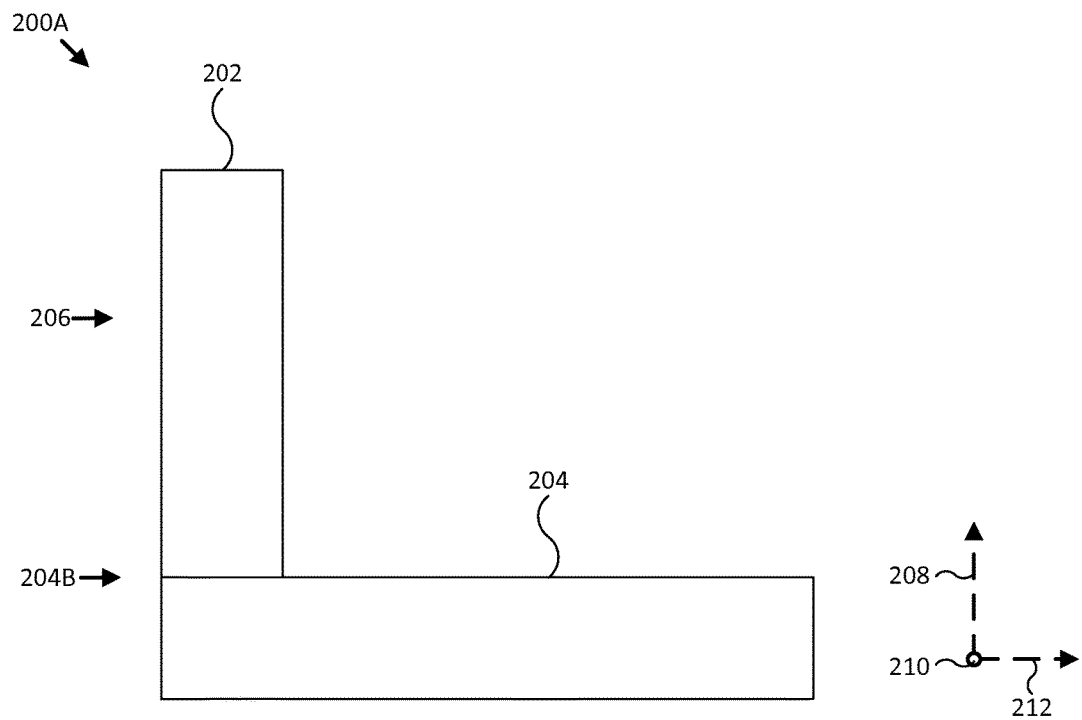
FIGS. 2A and 2B illustrate diagrams of an additive manufactured object in accordance with embodiments of the disclosure.
Figure 2B:
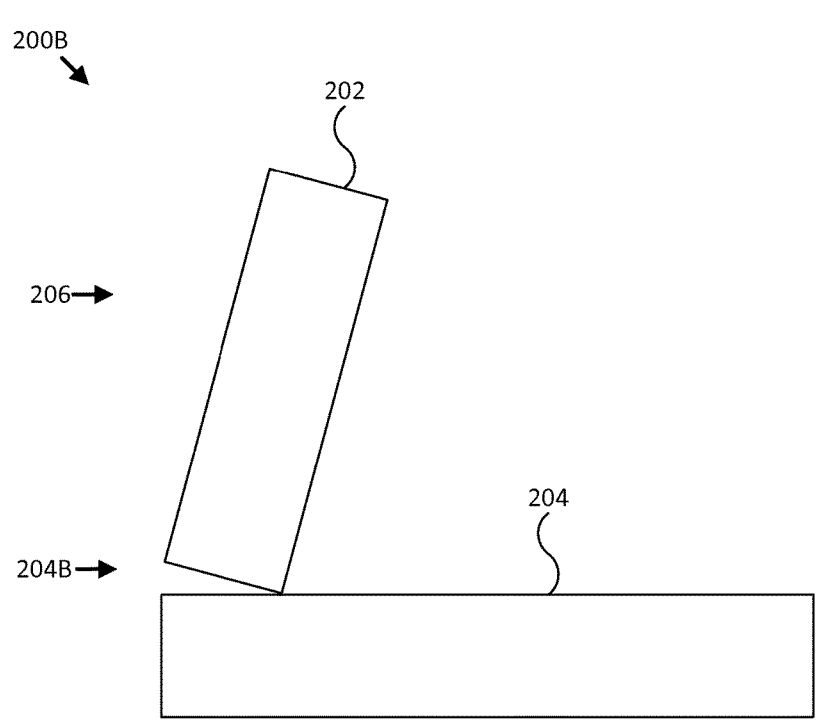

FIGS. 2A and 2B illustrate diagrams of additive manufactured object 200A in accordance with an embodiment of the disclosure. As shown, FIG. 2A is a cross-sectional view of structural layers 202 and 204, each of which may be formed from one or more sublayers that may, for example, take the form of sublayers 108, 110, and 112 described above in relation to FIG. 1A. For example, structural layers 202 and 204 may be formed by one or more extrusion sets 113. Thus, structural layers 202 and 204 may be formed by additive manufacturing apparatus 100A, additive manufacturing system 100B and/or a process described above in relation to FIGS. 1A and/or 1B. As illustrated, border 204B is shown between structural layers 202 and 204.

Directions 208, 210, and 212 describe one possible coordinate frame of additive manufactured object 200. As shown, direction 208 illustrates the Z-direction that may be substantially parallel to and/or aligned with layer 202.

Direction 210 illustrates the Y-direction going in and/or out of the page. Direction 212 illustrates the X-direction that may be substantially parallel to and/or aligned with layer 204. Further, force vector 206 may be substantially parallel to and/or aligned with layer 204, similar to force vector 122 that is substantially parallel to and/or aligned with sublayers 108, 110, and/or 112 in FIG. 1A. As shown, force vector 206 may be along or parallel to border 204B between structural layers 202 and 204, thereby indicating a potential susceptible or weak portion of additive manufactured object 200 at border 204B.

As shown in FIG. 2B, additive manufactured object 200B may include layers 202 and 204 as described above in relation to FIG. 2A. Yet, force vector 206 may cause layer 202 to peel away or collapse with respect to layer 204 at border 204B. As illustrated, force vector 206 creates tension and/or stress on additive manufactured object 200B, using a lever action on structural layer 202, which may cause structural layer 202 to separate from structural layer 204 at border 204B. For example, border 204B may correspond to a border between sublayers of additive manufactured object 200A/200B. In some instances, force vector 206 causes the peeling away or collapse due to force vector 206 being parallel to (e.g., but spaced from) border 204B.

Figure 3A:
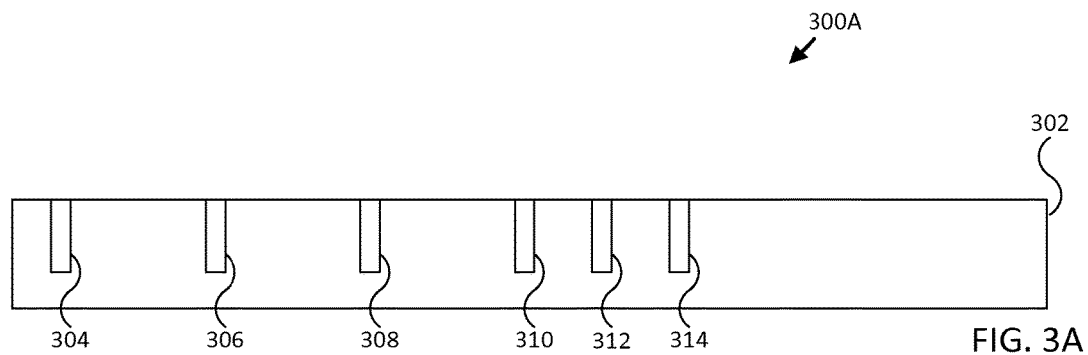
FIGS. 3A-3J illustrate diagrams of an additive manufactured object with reinforcement at different stages of manufacture in accordance with embodiments of the disclosure.

FIG. 3A illustrates a diagram of additive manufactured object 300A in accordance with an embodiment of the disclosure. FIG. 3A is a cross-sectional view of structural layer 302, which may be formed from one or more sublayers that may, for example, take the form of extrusion 116 described above in relation to FIG. 1A. In one embodiment, structural layer 302 may take the form of structural layer 204 described above in relation to FIGS. 2A-B. In addition, structural layer 302 may be formed by additive manufacturing apparatus 100A, additive manufacturing system 100B, and/or an additive manufacturing process described above in relation to FIGS. 1A through 2B. Further, structural layer 302 may be formed based on the shape, size, and/or complexity of a larger additive manufactured object formed with additive manufactured object 300A.

As illustrated, structural layer 302 may be formed with voids 304, 306, 308, 310, 312, and 314. Voids 304-314 may be empty spaces, channels, openings, passages, and/or vias formed from a top surface or border portion of layer 302 to a middle or central portion of structural layer 302. For example, each of voids 304-314 may include a cylindrically-shaped opening. In the embodiment shown in FIG. 3A, where structural layer 302 is a base or foundation layer of additive manufactured object 300A, for example, each void 304-314 extends partially through structural layer 302 to form respective partial voids as opposed to through voids or channels. For example, voids 304-314 may extend half way or three-quarters of the way through a thickness of structural layer 302. In various other embodiments, voids 304-314 may extend fully through structural layer 302, or some of voids 304-314 may extend partially through structural layer 302 and others may extend fully through structural layer 302. Notably, voids 304-314 may extend along structural layer 302 and/or at an orientation along one or more other dimensions of structural layer 302.

As shown, voids 304, 306, 308, and 310 may be substantially evenly spaced apart. For example, a distance between voids 304 and 306 may be substantially similar to a distance between voids 306 and 308, and/or a distance between 308 and 310. Further, voids 310, 312, and 314 may be substantially evenly spaced apart. For example, a distance between voids 310 and 312 may be substantially similar to a distance between voids 312 and 314. These distances may be selected to provide additional stability and/or reinforcement based on the shape, size, and/or complexity of additive manufactured object 300A, such that structural layer 302 provides a foundation layer to multiple other layers that may be formed on top of structural layer 302.

Figure 3B:
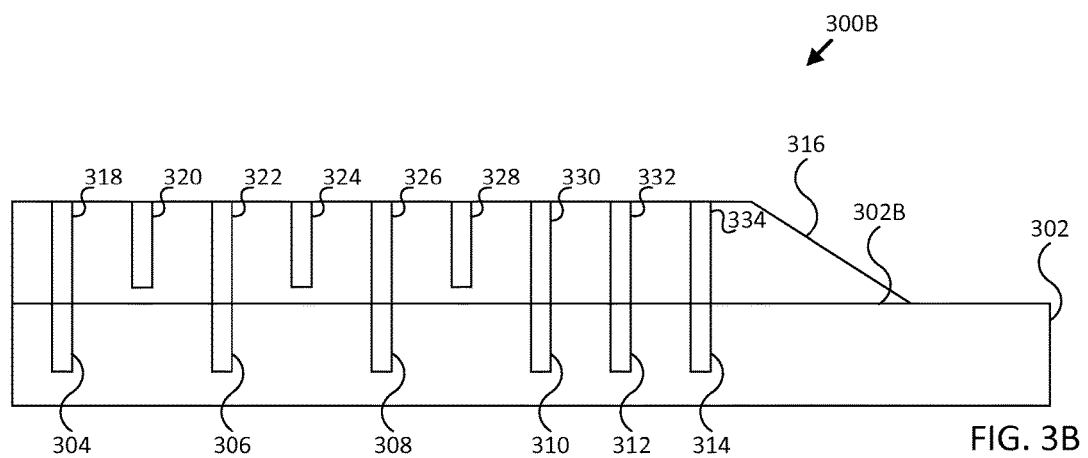
Figure 3C:
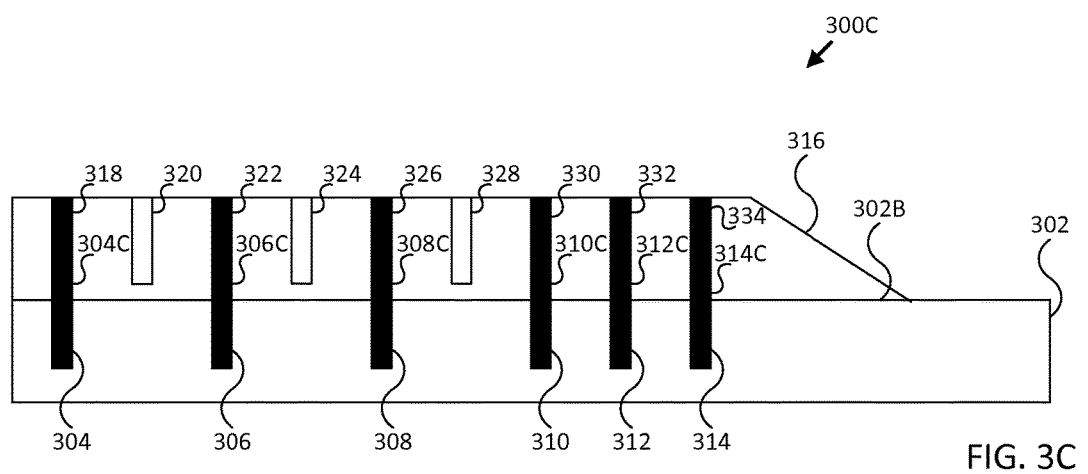

FIGS. 3B and 3C illustrate diagrams of additive manufactured objects 300B and 300C in accordance with an embodiment of the disclosure. FIGS. 3B and 3C include structural layer 302 as described above in relation to FIG. 3A. FIGS. 3B and 3C also show cross-sectional views of structural layer 316. As shown, structural layer 316 may be formed on top of (e.g., adjacent to) structural layer 302 such that a border 302B is defined between structural layers 302 and 316. In various embodiments, structural layers 302 and 316 may be formed by additive manufacturing apparatus 100A, additive manufacturing system 100B, and/or an additive manufacturing process as described above in relation to FIGS. 1A through 3A.

As illustrated in FIG. 3B, structural layer 316 may be formed with voids 318, 320, 322, 324, 326, 328, 330, 332, and 334. In some instances, voids 318-334 may be shaped similar to voids 304-314. Voids 318, 322, 326, 330, 332, and 334 may extend fully through a thickness of structural layer 316, or may extend partially through the thickness of structural layer 316, similar to voids 304-314 in structural layer 302. Yet further, voids 318, 322, 326, 330, 332, and 334 may extend through structural layer 316 to border 302B located between structural layers 302 and 316. Voids 304, 306, 308, 310, 312, and 314 may be formed to substantially align with voids 318, 322, 326, 330, 332, and 334, respectively, to form continuous cross-load voids across border 302B, as shown. Notably, in various other embodiments, voids 318-334 may extend along structural layer 316 and/or at an orientation along one or more other dimensions of structural layer 316.

As illustrated in FIG. 3C, additive manufactured object 300C may include additive manufactured object 300B. For example, additive manufactured object 300C may include structural layer 302 with voids 304-314 and structural layer 316 with voids 318-334. Yet further, voids 318, 322, 326, 330, 332, and 334 may extend through structural layer 316 to the border 302B located between structural layers 302 and 316. Thus, voids 304, 306, 308, 310, 312, and 314, substantially align with voids 318, 322, 326, 330, 332, and 334, respectively, thereby forming a cross-load void for each pair of substantially aligned voids. Further, the cross-load voids may be filled with one or more reinforcing materials to form cross-load members 304C, 306C, 308C, 310C, 312C, and 314C across the border 302B. As such, cross-load members 304C, 306C, 308C, 310C, 312C, and 314C may provide additional stability and/or reinforcement for structural layers 302 and 316 of additive manufactured object 300C. It should be noted that, in some instances, the number, pattern, and/or placement of cross-load members extending through structural layers 302 and 316 may be identified by additive manufacturing apparatus 100A and/or additive manufacturing system 100B described above. Further, additive manufacturing system 100B may determine the number, pattern, and/or placement of the cross-load members for maintaining or increasing the stability of structural layers 302 and 316, as opposed to arbitrarily adding more cross-load members in addition to cross-load members 304C-314C in structural layers 302 and 316.

Figure 3D:
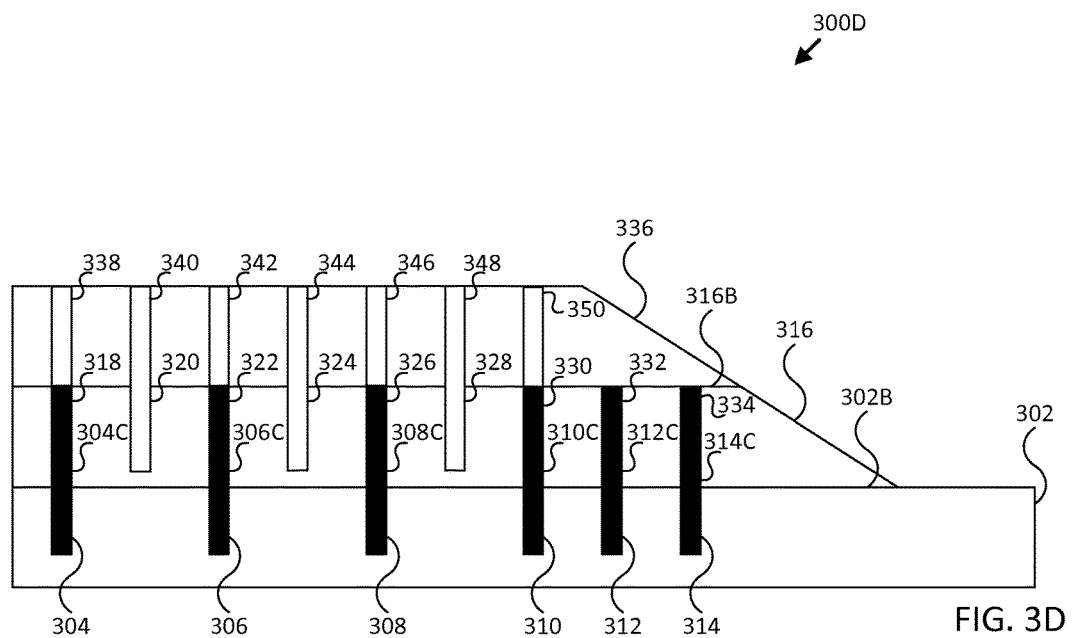
Figure 3E:
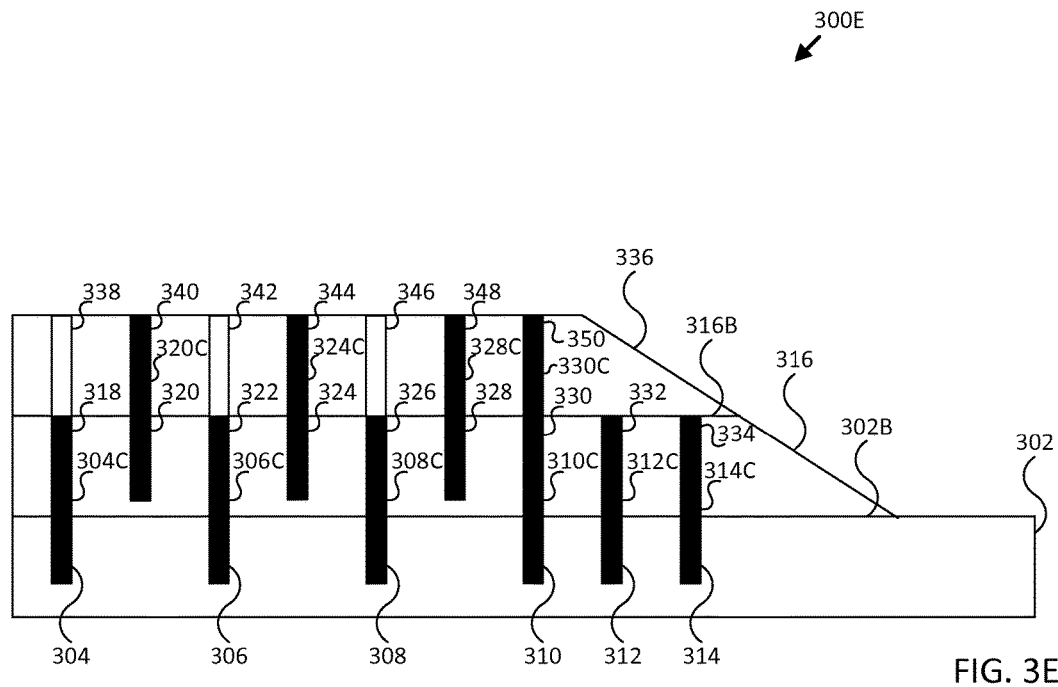

FIGS. 3D and 3E illustrate diagrams of additive manufactured objects 300D and 300E, respectively, with additional structural layers in accordance with an embodiment of the disclosure. FIGS. 3D and 3E illustrate layers 302 and 316, as described above in relation to FIG. 3C. Further, FIGS. 3D and 3E show cross-sectional views of structural layer 336. As shown, a structural layer 336 may be formed on top of (e.g., adjacent to) structural layer 316 such that a border 316B is defined between structural layers 316 and 336. As such, structural layers 302, 316, and 336 may be formed by additive manufacturing apparatus 100A, additive manufacturing system 100B, and/or an additive manufacturing process described above in relation to FIGS. 1A through 3C.

As illustrated in FIG. 3D, structural layer 336 may be formed with voids 338, 340, 342, 344, 346, 348, and 350. In some instances, voids 338-350 may be shaped similar to voids 318-334. Voids 338-350 may extend through structural layer 336 to border 316B located between structural layers 316 and 336. Further, voids 318, 320, 322, 324, 326, 328, and 330 align with voids 338, 340, 342, 344, 346, 348, and 350, respectively, to form cross-load voids across border 316B. Notably, in various other embodiments, voids 338-350 may extend along structural layer 336 and/or at an orientation along one or more other dimensions of structural layer 336.

As illustrated in FIG. 3E, additive manufactured object 300E may include additive manufactured object 300D. For example, additive manufactured object 300E includes structural layer 302 with voids 304-314, structural layer 316 with voids 318-334, and structural layer 336 with voids 338-350. Voids 340, 344, and 348 may extend through structural layer 336 to border 316B located between structural layers 316 and 336. Thus, voids 320, 324, and 328 of structural layer 316 substantially align with voids 340, 344, and 348 of structural layer 336, respectively, thereby forming a cross-load void for each pair of substantially aligned voids. Further, the cross-load voids may be filled with one or more reinforcing materials to form cross-load members 320C, 324C, and 328C across border 316B. It should be noted that void 350 may also be filled with the one or more reinforcing materials to form cross-load member 330C that combines with, extends, and/or includes cross-load member 310C, possibly to form a single cross-load member through structural layers 302, 316, and/or 336. By spanning multiple structural layers 302, 316, and/or 336, the single cross-load members may provide additional stability and/or reinforcement in additive manufactured object 300E based on the shape, size, and/or complexity of additive manufactured object 300E, among on other factors related to additive manufactured object 300E.

Figure 3F:
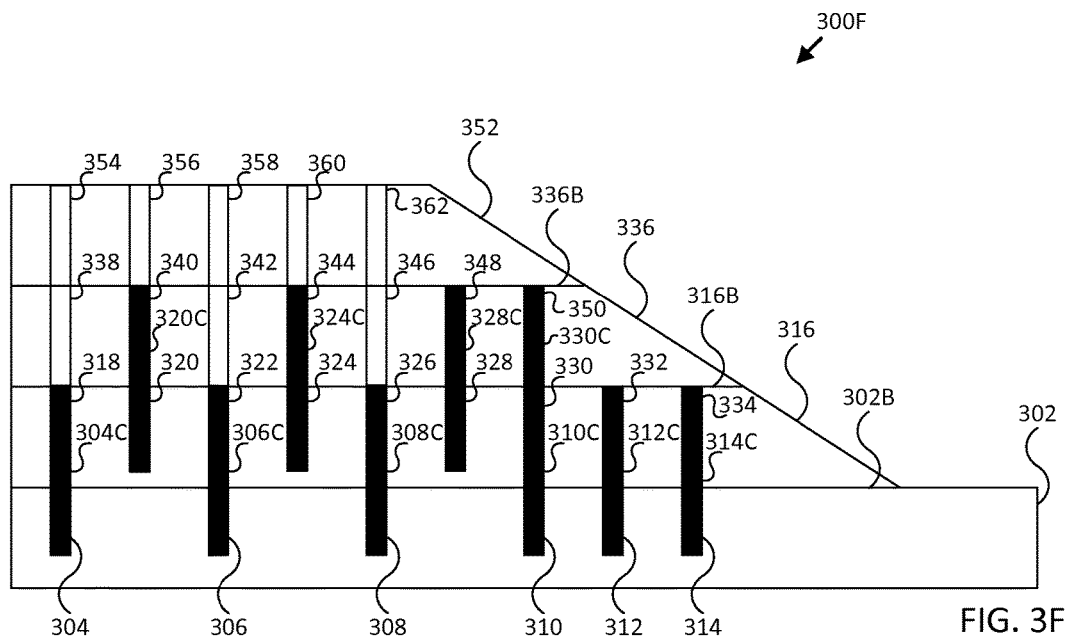
Figure 3G:
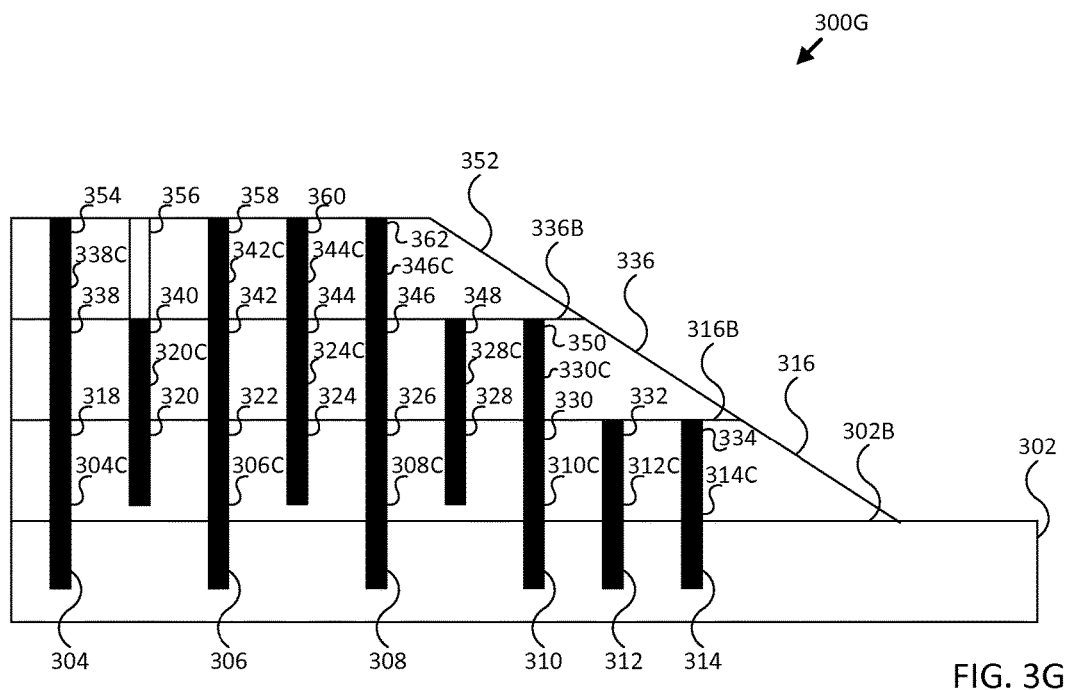

FIGS. 3F and 3G illustrate diagrams of additive manufactured objects 300F and 300G, respectively, with additional structural layers in accordance with an embodiment of the disclosure. FIGS. 3F and 3G illustrate structural layers 302, 316, and 336, as described above in relation to FIG. 3E. Further, FIGS. 3F and 3G are cross-sectional views of a structural layer 352. As shown, structural layer 352 may be formed on top of (e.g., adjacent to) structural layer 336 such that a border 336B is defined between structural layers 336 and 352. Thus, structural layers 302, 316, 336, and/or 352 may be formed by additive manufacturing apparatus 100A, additive manufacturing system 100B, and/or an additive manufacturing process described above in relation to FIGS. 1A through 3E.

As illustrated in FIG. 3F, structural layer 352 may be formed with voids 354, 356, 358, 360, and 362. In some instances, voids 354-362 may be shaped similar to voids 304-314, 318-334, and/or 338-350. For example, as shown, voids 354-360 may extend through structural layer 352 to a border 336B located between structural layers 336 and 352. Further, voids 338, 340, 342, 344, and 346 align with voids 354, 356, 358, 360, and 362, respectively. Yet further, voids 338, 342, and 346 of structural layer 336 align with voids 354, 358, and 362 of structural layer 352, respectively, to form cross-load voids across border 336B. Notably, in various other embodiments, voids 354-362 may extend along structural layer 352 and/or at an orientation along one or more other dimensions of structural layer 352.

As illustrated in FIG. 3G, additive manufactured object 300G may include additive manufactured object 300F. For example, additive manufactured object 300G may include structural layer 302 with voids 304-314. Further, additive manufactured object 300G may include structural layer 316 with voids 318-334. Yet further, additive manufactured object 300G may include structural layer 336 with voids 338-350. In addition, additive manufactured object 300G may include structural layer 352 with voids 354-362. In addition, voids 338, 342, and 346 of structural layer 336 align with voids 354, 358, and 362 of structural layer 352, respectively, to form cross-load voids across border 336B. Further, the cross-load voids may be filled with one or more reinforcing materials to form cross-load members 338C, 342C, and/or 346C across border 336B.

It should be noted that void 360 may also be filled with the one or more reinforcing materials to form cross-load member 344C that combines with, extends, and/or includes cross-load member 324C, possibly to form a single cross-load member through structural layers 316, 336, and/or 352. Further, cross-load member 338C may be formed to combine with and/or include cross-load member 304C, possibly to form a single cross load member through structural layers 302, 316, 336, and/or 352. Further, the cross-load member 342C may be formed to combine with and/or include cross-load member 306C, possibly to form a single-cross load member through structural layers 302, 316, 336, and/or 352. Yet further, cross-load member 346C may be formed to combine with and/or include cross-load member 308C, possibly to form a single-cross load member through structural layers 302, 316, 336, and/or 352. By spanning multiple structural layers 302, 316, 336, and/or 352, the single cross-load members provide additional stability and/or reinforcements in additive manufactured object 300G based on the shape, size, and/or complexity of additive manufactured object 300G, among on other factors related to additive manufactured object 300G. In addition, by filling multi-level cross load voids as each structural layer is formed, rather than after multiple structural layers are formed, embodiments can reduce a risk of partially filling the cross load voids due to the reinforcing material partially curing or becoming more viscous as it is injected into the cross load voids (e.g., at a border of a structural layer) to form the cross load members.

Figure 3H:
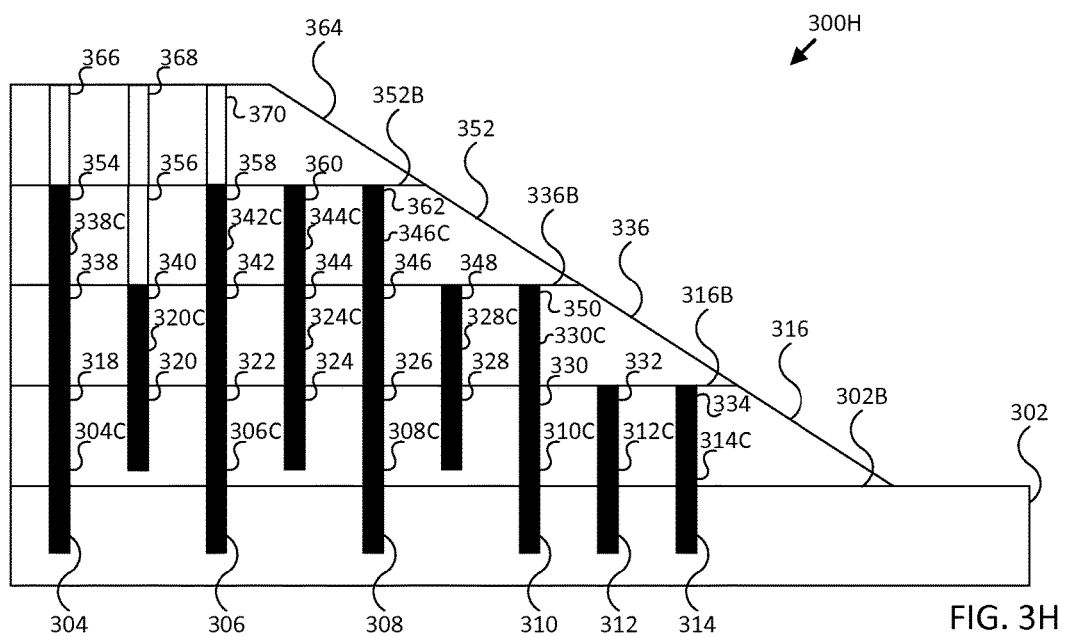
Figure 3I:
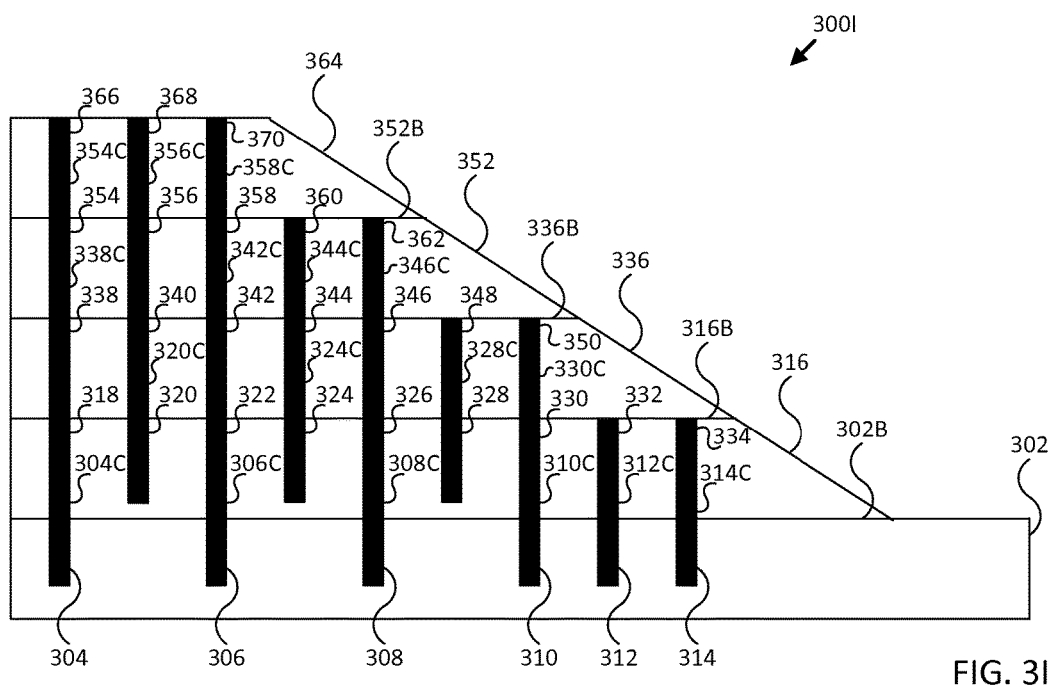

FIGS. 3H and 3I illustrate diagrams of additive manufactured objects 300H and 300I, respectively with additional structural layers in accordance with an embodiment of the disclosure. FIGS. 3H and 3I include structural layers 302, 316, 336, and 352, as described above in relation to FIG. 3G. Further, FIGS. 3H and 3I show cross-sectional views of structural layer 364. As shown, structural layer 364 may formed on top of (e.g., adjacent to) structural layer 352 to form a border 352B between structural layers 352 and 364. Thus, structural layers 302, 316, 336, 352, and 364 may be formed by an additive manufacturing system and/or an additive manufacturing process described above in relation to FIGS. 1A through 3G. Further, structural layers 302, 316, 336, 352, and/or 364 may be formed based on the shape, size, and/or complexity of a larger additive manufactured object formed with additive manufactured objects 300H and/or 300I.

As illustrated in FIG. 3H, structural layer 364 may be formed with voids 366, 368, and 370. In some instances, voids 366-370 may be shaped similar to voids 304-314, 318-334, 338-350, and/or 354-362. For example, as shown, voids 366-370 may extend through structural layer 364 to a border 352B located between structural layers 352 and 364. Notably, in various other embodiments, voids 366-372 may extend along structural layer 364 and/or at an orientation along one or more other dimensions of structural layer 364. Further, voids 354, 356, and 358 align with voids 366, 368, and 370, respectively. Yet further, void 356 of structural layer 352 align with void 368 of structural layer 364 to form a cross-load void across border 352B.

As illustrated in FIG. 3I, additive manufactured object 300I may include additive manufactured object 300H. For example, additive manufactured object 300I may include structural layer 302 with voids 304-314. Further, additive manufactured object 300I may include structural layer 316 with voids 318-334. Yet further, additive manufactured object 300I may include structural layer 336 with voids 338-350. In addition, additive manufactured object 300I may include structural layer 352 with voids 354-362. Further, additive manufactured object 300I may include structural layer 364 with voids 366-370. As noted, void 356 align with void 368, respectively, to form a cross-load void across border 352B. Further, the cross-load void is filled with one or more reinforcing materials to form cross-load member 356C across border 352B.

It should be noted that voids 366 and/or 370 may also be filled with the one or more reinforcing materials to form cross-load members 354C and/or 356C, respectively. For example, cross-load member 354C may combine with and/or include cross-load members 304C and/or 338C, possibly to form a single cross-load member through structural layers 302, 316, 336, and/or 352. Further, cross-load member 356C may combine with and/or include cross-load members 306C and/or 342C, possibly to form a single cross-load member through structural layers 302, 316, 336, and/or 352. Further, cross-load member 356C may be formed to combine with and/or include cross-load member 320C, possibly to form a single-cross load member through structural layers 316, 336, and/or 352. By spanning multiple structural layers 302, 316, 336, and/or 352, the single cross-load members provide additional stability and/or reinforcement in additive manufactured object 300I based on the shape, size, and/or complexity of additive manufactured object 300I, among on other factors related to additive manufactured object 300I.

Figure 3J:
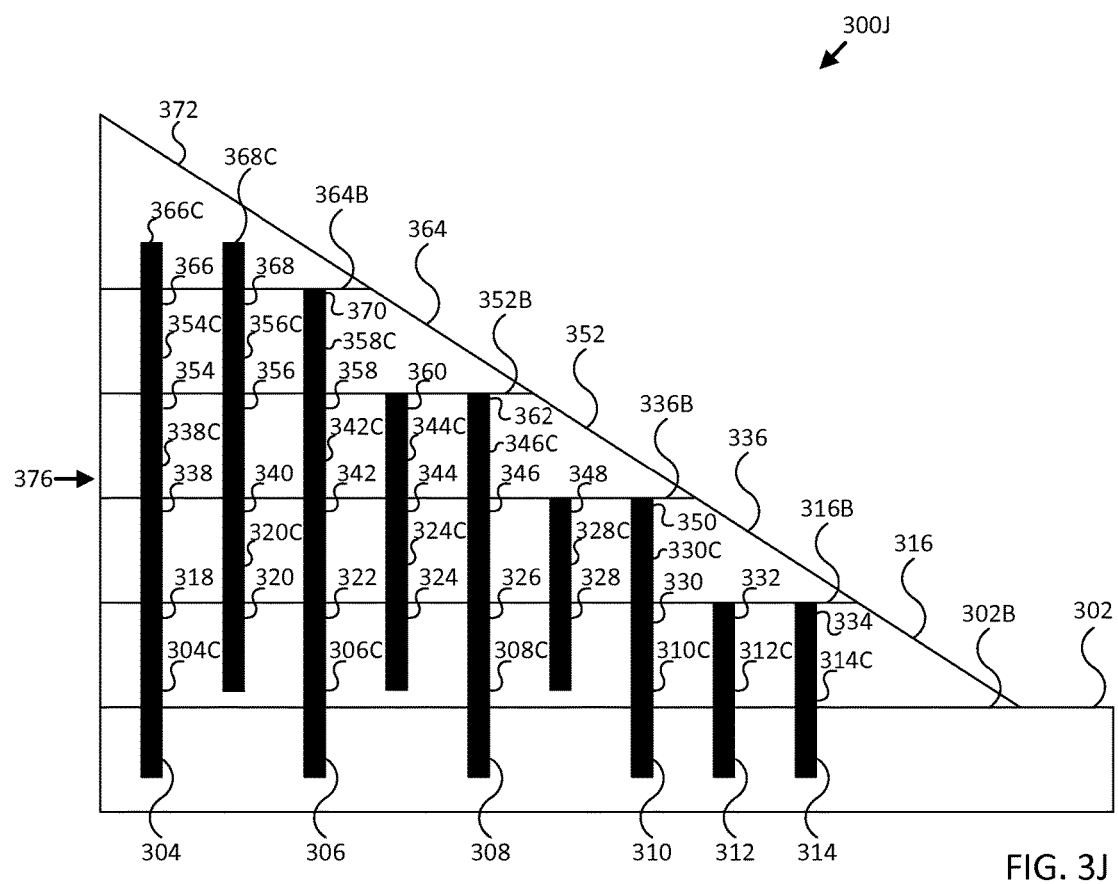

FIG. 3J illustrates a diagram of additive manufactured object 300J in accordance with an embodiment of the disclosure. As shown, additive manufactured object 300J may include additive manufactured object 300I described above in relation to FIG. 3I. For example, additive manufactured object 300J may include structural layer 302 with voids 304-314, structural layer 316 with voids 318-334, structural layer 336 with voids 338-350, structural layer 352 with voids 354-362, and/or structural layer 364 with voids 366-370. Yet further, FIG. 3J may provide a cross-sectional view of structural layer 372. Thus, structural layers 302, 316, 336, 352, 364, and/or 372 may be formed by an additive manufacturing system and/or an additive manufacturing process described above in relation to FIGS. 1A through 3I. Further, structural layers 302, 316, 336, 352, 364, and/or 372 may be formed based on the shape, size, and/or complexity of additive manufactured object 300J.

As illustrated in FIG. 3J, cross-load member 366C may be formed in structural layer 372 to combine with and/or include cross-load member 354C, 338C, and 304C, possibly to form a single cross-load member through structural layers 302-372 and/or across borders 302B, 316B, 336B, 352B, and 364B. Further, cross-load member 368C may be formed in structural layer 372 to combine with and/or include cross-load member 356C and/or 320C across borders through structural layers 316-372 and/or across 302B, 316B, 336B, 352B, and 364B. By spanning multiple structural layers 302, 316, 336, 352, and/or 372 the single cross-load members provide additional stability and/or reinforcements in additive manufactured object 300I based on the shape, size, and/or complexity of additive manufactured object 300J, among on other factors related to additive manufactured object 300J. For example, force vector 376 may be applied substantially parallel to and/or aligned with structural layers 302-372. As shown, force vector 376 may be along borders between structural layers 302, 316, 336, 352, 364, and/or 372. Yet, the additional stability and/or the reinforcements provided by cross-load members 366C, 358C, 344C, 346C, 328C, 330C, 312C, and 314C maintain the structure and stability of o additive manufactured object 300J.

Although not fully shown in FIG. 3J, cross load members 366C and 368C may be formed by filling cross load voids 366 and 368 at an intermediate formation step of structural layer 372, such as before forming a top or cap portion of structural layer 372. In some embodiments, structural layer 372 may be referred to as a top or cap portion of additive manufactured object 300J.

Figure 4:
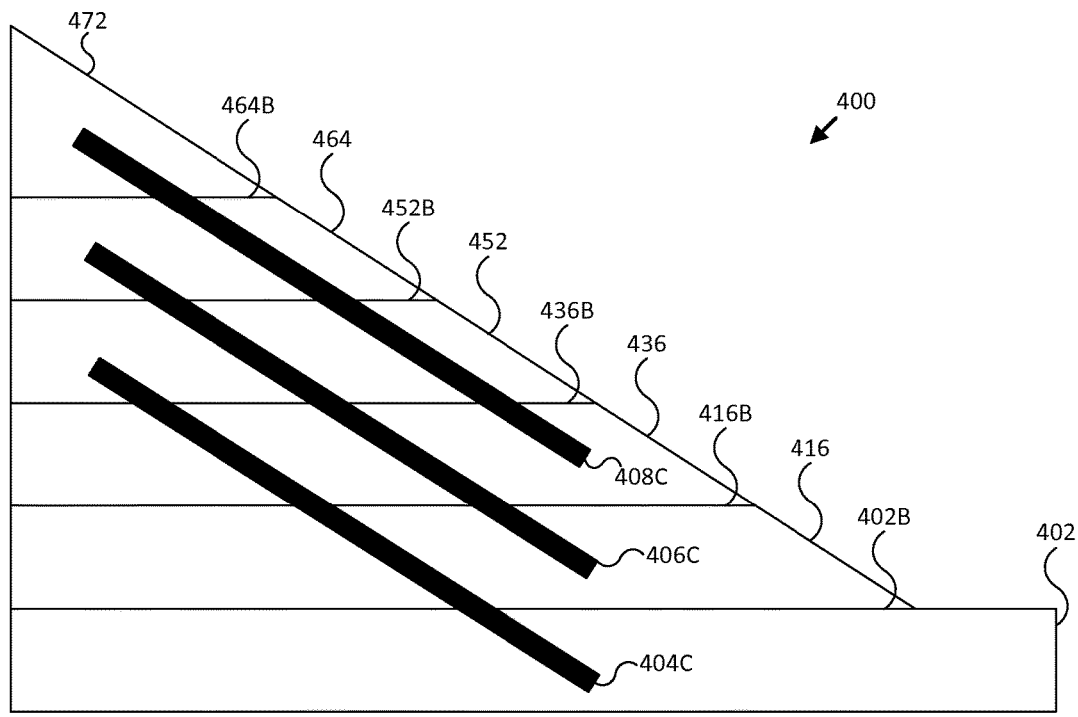
FIGS. 4 and 5 illustrate diagrams of additive manufactured objects with reinforcement in accordance with embodiments of the disclosure.
Figure 5:
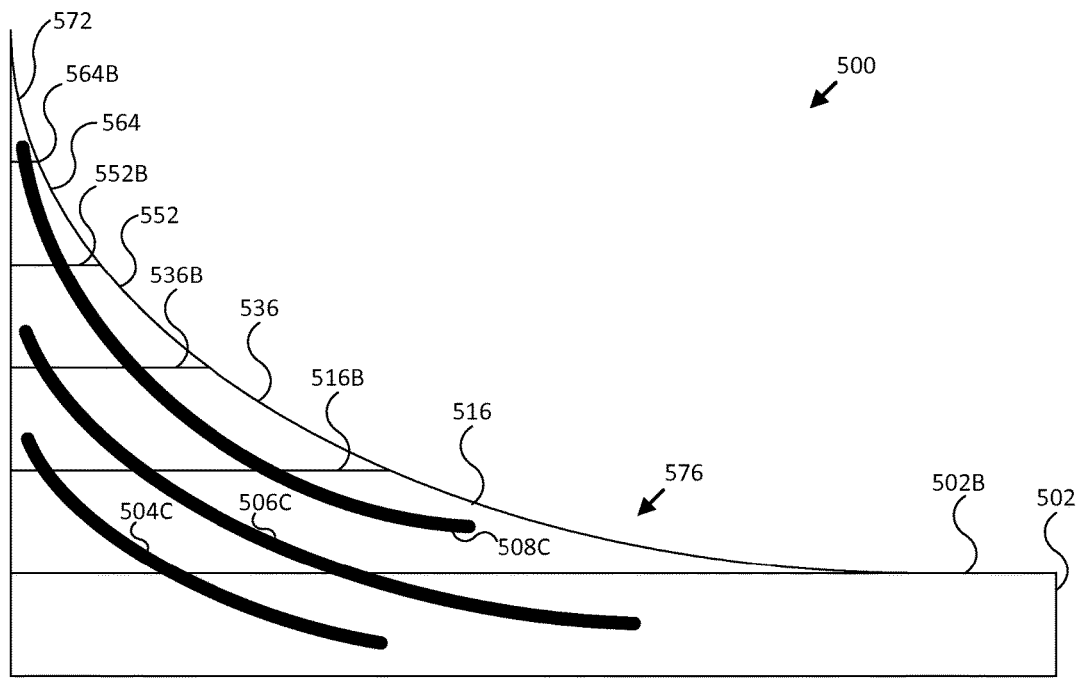

FIGS. 4 and 5 illustrate diagrams of additive manufactured objects 400 and 500, respectively, with reinforced structural layers in accordance with embodiments of the disclosure. As shown, additive manufactured objects 400 and 500 are alternative embodiments that can be formed by additive manufacturing apparatus 100A, additive manufacturing system 100B, and/or an additive manufacturing process as described above in relation to FIGS. 1A through 3J. In FIG. 4, additive manufactured object 400 may include structural layers 402-472 similar to structural layers 302-372 of additive manufactured object 300J. Yet, cross-load members 404C, 406C, and 408C may be formed diagonally (e.g., non-perpendicularly across borders between the structural layers) through structural layers 402, 416, 436, 452, 464, and/or 472 and across borders 402B, 416B, 436B, 452B, and/or 464B, as shown.

As illustrated in FIG. 5, additive manufactured object 500 may include structural layers similar to that of additive manufactured object 400. Yet, additive manufactured object 500 may include a curvature or curved surface 576. Thus, cross-load members 504C, 506C, and 508C may also be formed curved or axially curved through layers 502, 516, 536, 552, 564, and/or 572 and across borders 502B, 516B, 536B, 552B, and/or 564B. As shown, cross-load members 504C, 506C, and 508C may be rounded, curled, bowed, and/or arched cross-load members, possibly based on shape, size, and/or complexity of additive manufactured object 500 to provide additional stability and/or reinforcements in additive manufactured object 500 based on the shape, size, and/or complexity of additive manufactured object 500, among on other factors related to additive manufactured object 500.

Figure 6:
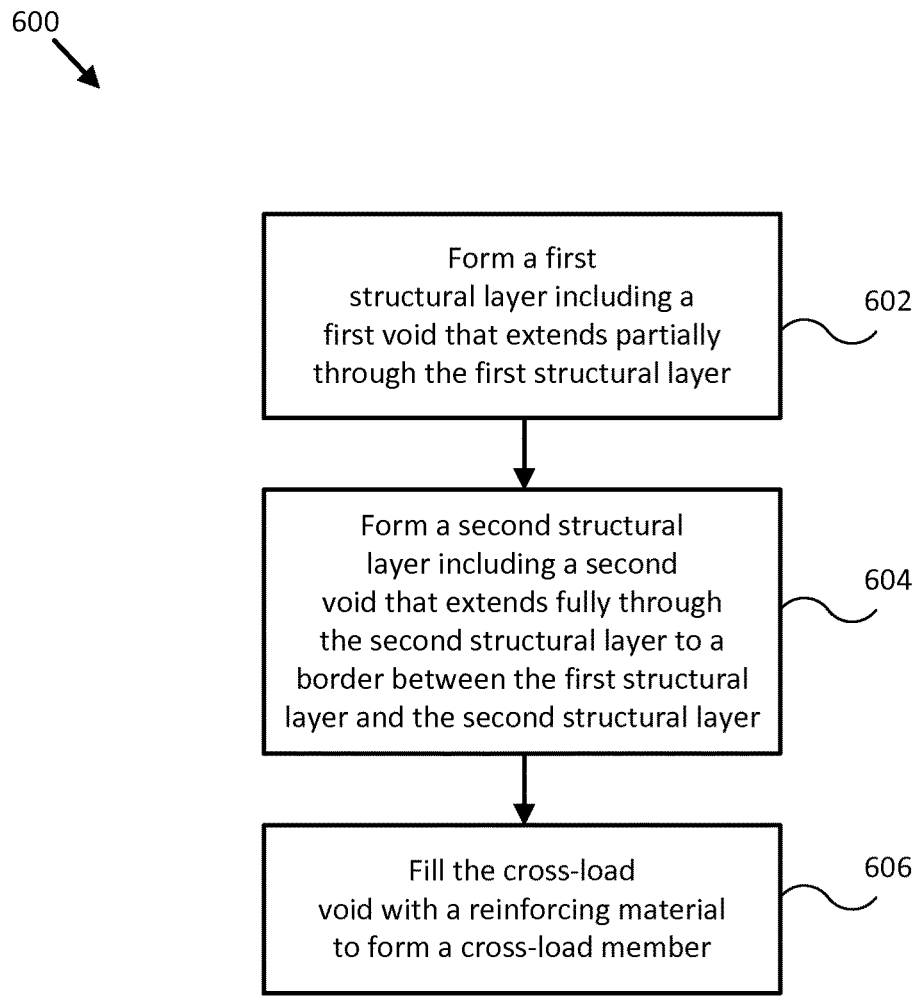
FIG. 6 illustrates a flow diagram in accordance with an embodiment of the disclosure.

FIG. 6 illustrates a flow diagram 600 in accordance with an embodiment of the disclosure. The operations shown in FIG. 6 may be implemented as software instructions executed by logic device 132 associated with corresponding elements of FIGS. 1A and/or 1B or with any combination of software instructions and/or electronic hardware (e.g., inductors, capacitors, amplifiers, or other analog and/or digital components). Any step, sub-step, sub-process, or block of process 600 may be performed in an order or arrangement different from the embodiments illustrated by FIG. 6.

In block 602, process 600 includes forming a first structural layer including a void that extends partially through the first structural layer. For example, referring back to FIG. 3A, process 600 includes forming first structural layer 302 including void 304 that extends partially through first structural layer 302.

In block 604, process 600 includes forming a second structural layer including a second void that extends fully through the second structural layer to a border between the first structural layer and the second structural layer. Further, the first and second voids align to form a cross-load void across the border between the first and second structural layers. For example, referring back to FIGS. 3B and 3C, process 600 includes forming second structural layer 316 including second void 318 that extends fully through second structural layer 316 to border 302B located between first structural layer 302 and second structural layer 316. As such, first void 304 and second void 318 align to form a cross-load void across border 302B between first structural layer 302 and second structural layer 316.

In block 606, process 600 includes filling the cross-load void with a reinforcing material to form a cross-load member. For example, referring back to FIG. 3C, process 600 includes filling the cross-load void, including voids 304 and 318, with a reinforcing material to form cross-load member 304C. In some embodiments, first structural layer 302 and second structural layer 316 may form at least a portion of a fused filament fabrication (FFF) object, a laser sintering object, a stereolithography object, and/or an electron beam object, among other types of additive manufactured objects.

In some embodiments, forming first structural layer 302 in process 600 may include forming third void 306, fourth void 310, and fifth void 312 that extend partially through first structural layer. As shown in FIGS. 3A, 3B, and/or 3C, first void 304 may be adjacent to third void 306, and fourth void 310 may be adjacent to fifth void 312. In particular, first void 304 may indirectly make contact with (e.g., be disposed next to each other in the same structural layer 302, without interstitial voids) third void 306 and fourth void 310 may indirectly make contact with fifth void 312. In some instances, a distance between first void 304 and third void 306 may be greater than a distance between fourth void 310 and fifth void 312.

In some embodiments, forming first structural layer 302 in process 600 may also include forming third void 306 that extends partially through first structural layer 302. Further, forming second structural layer 316 in process 600 may also include forming fourth void 320 that extends partially through second structural layer 316 and fifth void 322 that extends fully through second structural layer 316. As shown in FIGS. 3A, 3B, and/or 3C, fourth void 320 is positioned between second void 318 and fifth void 322 in structural layer 316. As such, third void 306 and fifth void 322 align to form a second cross-load void across border 302B between first structural layer 302 and second structural layer 316. As such, process 600 may include filling the second cross-load void with the reinforcing material to form second cross-load member 306C.

In some embodiments, process 600 may include forming additional structural layers including additional voids to form additional cross-load voids across respective borders between the additional structural layers. For example, referring back to FIGS. 3D-3J, process 600 may include forming additional layers 336, 352, 364, and/or 372 including additional voids 338-350, 354-362, and/or 366-370 across respective borders 316B, 336B, 352B, and/or 364B. Further, process 600 may include filling the additional cross-load voids with the reinforcing material to form additional cross-load members across respective borders between the additional structural layers. For instance, process 600 may include filling the additional cross-load voids with the reinforcing material to form additional cross-load members 308C-368C across respective border 316B-364B between the additional structural layers 336-372.

In some embodiments, forming second structural layer 316 including second void 318 in process 600 may also include forming second structural layer 316 including a sealed cross-load void. For example, the sealed cross-load void, possibly combining first void 304 and second void 318, may be sealed from second structural layer 316 through first structural layer 302 across border 302B. Further, filling the cross-load void with the reinforcing material in process 600 may include preventing the reinforcing material from leaking from the sealed cross-load void. For instance, the sealed cross-load void may prevent the reinforcing material from leaking from border 302B, first void 304, and/or second void 318. In one embodiment, sealing a cross-load void may include forming sublayers around the cross load void with a particular shape, thickness, and/or according to a particular speed or temperature to reduce a risk of a gap between sublayers surrounding the cross-load void and/or a bottom or end of a cross-load void. In some embodiments, first void 304 and second void 318 formed in process 600 may include first and second axially curved shapes. For example, referring back to FIG. 5, first void 304 and second void 318 may include the axially curved shape of cross-load member 304C shown in structural layers 336, 316, and/or 302.

Figure 7:
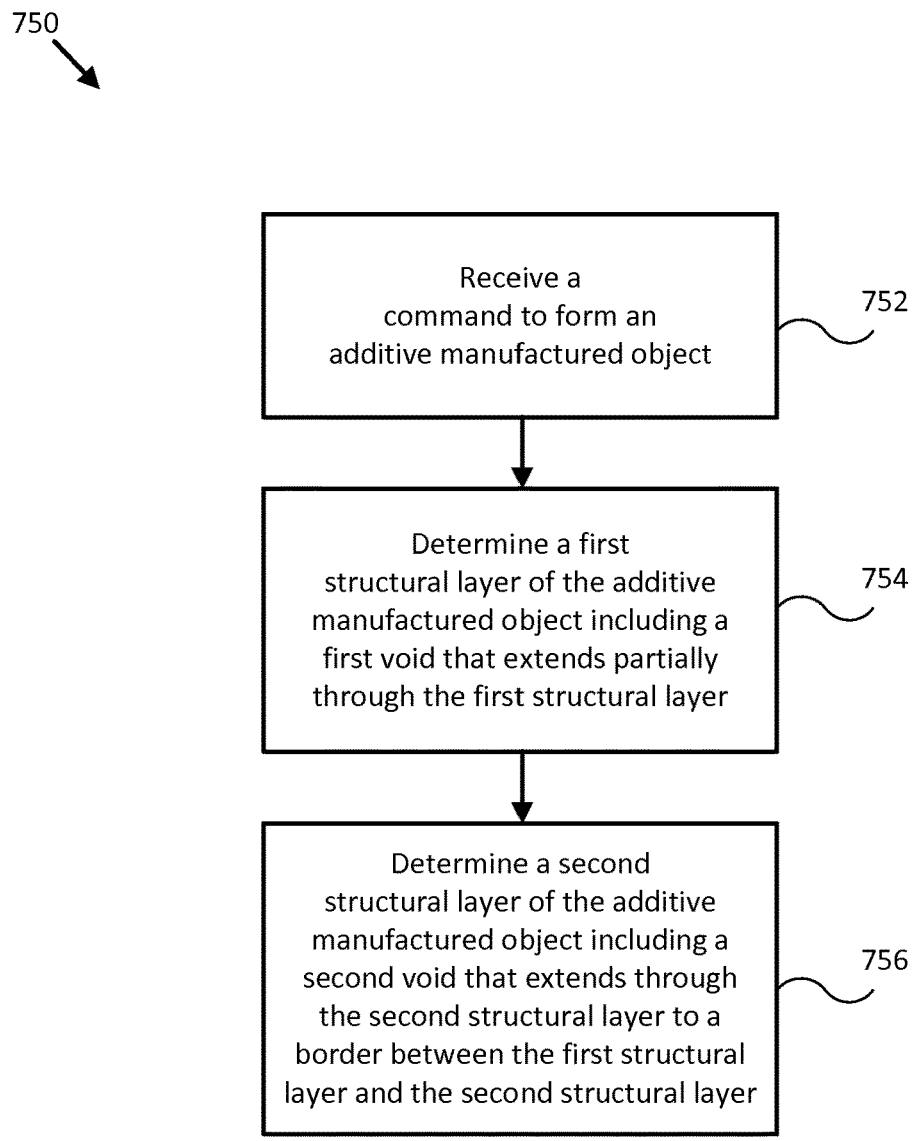
FIG. 7 illustrates a flow diagram in accordance with an embodiment of the disclosure.

FIG. 7 illustrates a flow diagram 750 in accordance with an embodiment of the disclosure. The operations of FIG. 7 may be implemented as software instructions executed by logic device 132 or computers associated with corresponding elements of FIGS. 1A and/or 1B, or with any combination of software instructions and/or electronic hardware (e.g., inductors, capacitors, amplifiers, or other analog and/or digital components). Any step, sub-step, sub-process, or block of process 750 may be performed in an order or arrangement different from the embodiments illustrated by FIG. 7.

In block 752, process 750 includes receiving a command to form an additive manufactured object. For example, referring back to FIGS. 1A and/or 1B, process 750 may include a computer, such as logic device 132, receiving a command to form additive manufactured object 300J (e.g., fused filament fabrication (FFF) object), among other possible additive manufactured objects 300A-I. Further, additive manufactured object 300J may be graphically rendered on a display of logic device 132. In some instances, the command to form additive manufactured object 300J may indicate a shape, a height, a length, a width, a thickness, and/or other characteristics of additive manufactured object 300J.

In block 754, process 750 includes determining a first structural layer of the additive manufactured object including a first void that extends partially through the first structural layer. For example, based on the computer receiving the command to form additive manufactured object 300J, process 750 may include determining first structural layer 302 of additive manufactured object 300J including first void 304 that extends partially through first structural layer 302.

In block 756, process 750 includes determining a second structural layer of the additive manufactured object including a second void that extends through the second structural layer to a border between the first structural layer and the second structural layer. For example, process 750 may include determining second structural layer 316 of additive manufactured object 300J including second void 318 that extends through second structural layer 316 to border 302B between first structural layer 302 and second structural layer 316. As such, first void 304 and second void 318 align to form a cross-load void across border 302B between first structural layer 302 and second structural layer 316.

In various embodiments, the command in process 750 to form additive manufactured object 300J may indicate a shape, a height, a length, a width, and/or other characteristic of additive manufactured object 300J. In some instances, process 750 may include determining a reinforcing material to fill the cross-load void and form cross-load member 304C based on the command.

In some embodiments, receiving the command to form additive manufactured object 300J in process 750 may include receiving expected force vector 376 on the additive manufactured object 300J. For example, expected force vector 376 on additive manufactured object 300J may be substantially parallel to and/or aligned with border 302B between structural layers 302 and/or 316, substantially parallel to and/or aligned with borders 302B-364B between structural layers 302-372 in FIG. 3J. As such, expected force vector 376 may weaken the structure of additive manufactured object 300J. As noted, force vectors may cause structural layers to peel away or collapse with respect to other layers due to tension and/or stress on the object. As such, determining first structural layer 302 and second structural layer 316 of additive manufactured object 300J in process 750 may include determining locations in first structural layer 302 and second structural layer 316 to form first void 304 and second void 318 based on expected force vector 376.

In some embodiments, an indication of expected force vector 376 may be received as user input provided to logic device 132, for example. Further, process 750 may include determining a depth, a height, a thickness, a shape, and/or a width of the first void 304 and/or the second void 318 based on expected force vector 376. For example, based on expected force vector 376 on additive manufactured object 300J being substantially parallel to and/or aligned with border 302B between layers 302 and/or 316, the first void 304 and/or the second void 318 may be axially curved to create curved cross-load members such as cross-load members 504C, 506C, and/or 508C shown in FIG. 5.

In some embodiments, expected force vector 376 may be received as described above. Further, process 750 may include selecting a first material to form the first and second structural layers 302 and 316, respectively, based on expected force vector 376. Further, process 750 may include selecting a second material to fill the cross-load void based on a viscosity of the second material, a cure time of the second material, a cured strength of the second material, and/or an available size of associated cross load voids (e.g., limited by a thickness of a wall or other portion of object 300J). For example, acrylonitrile butadiene styrene (ABS) may be selected the first material selected to form the first and second structural layers 302 and 316, and the second material to fill the cross-load void may be selected based on a cured strength of the second material being higher than that of the ABS.

In some embodiments, process 750 may include determining one or more susceptible portions of additive manufactured object 300J. For example, based on the command received to form additive manufactured object 300J, determining first and/or second structural layers 302 and 316 of additive manufactured object 300J in process 750 may include determining locations, sizes, shapes, and/or patterns in first and/or second structural layers 302 and/or 316 to form the first and/or second voids 304 and 318, respectively, based on the one or more susceptible portions. In various embodiments, such susceptible portions may include relatively long or thin portions of an additive manufactured object, such as where a length of an additive manufactured object exceeds a width of the additive manufactured object, or where the additive manufactured object is thinnest as compared to the remaining portions of the additive manufactured object. For example, logic device 132 may be configured to determine that additive manufactured object 200A of FIG. 2A includes susceptible portion, e.g., border 204B, based on the thickness and/or height of structural layer 202 relative to the thickness and/or height of structural layer 204 and/or the width of border 204B. Moreover, such determination may also be based on the orientation of sublayers forming each of structural layers 202 and 204, which may indicate susceptibility to peeling if subjected to forces that would cause sublayers to delaminate from each other.

Figure 8:
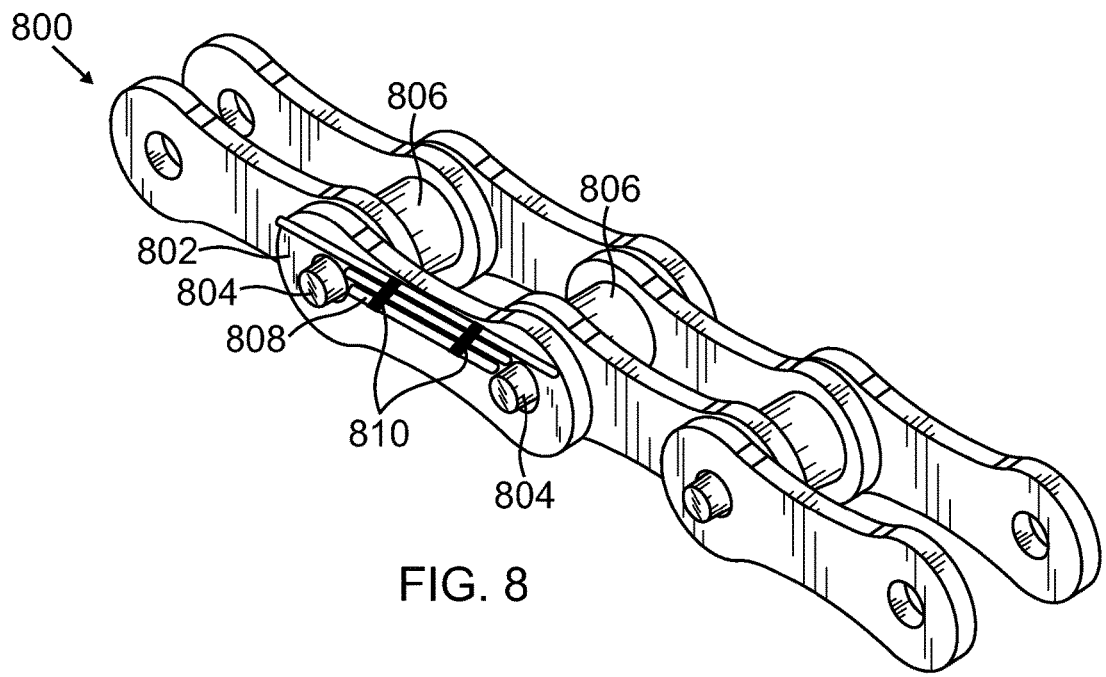
FIGS. 8-13 illustrate diagrams of additive manufactured objects with reinforcement in accordance with embodiments of the disclosure.

FIG. 8 illustrates a diagram of a reinforced additive manufactured object 800 in accordance with an embodiment of the disclosure. As shown, additive manufactured object 800 may take the form of a linked chain, such as a bicycle and/or motorcycle chain. Further, additive manufactured object 800 may be formed by an additive manufacturing system and/or an additive manufacturing process described above in relation to FIGS. 1A through 7. In particular, outer plate 802, link pins 804, and/or rollers 806 may be formed by structural layers and cross-load members such as those described above. As shown, for example, outer plate 802 may be formed with structural layers 808 and cross-load members 810. Several other structural layers and cross-load members and corresponding arrangements may be formed to create additive manufactured object 800.

Figure 9:
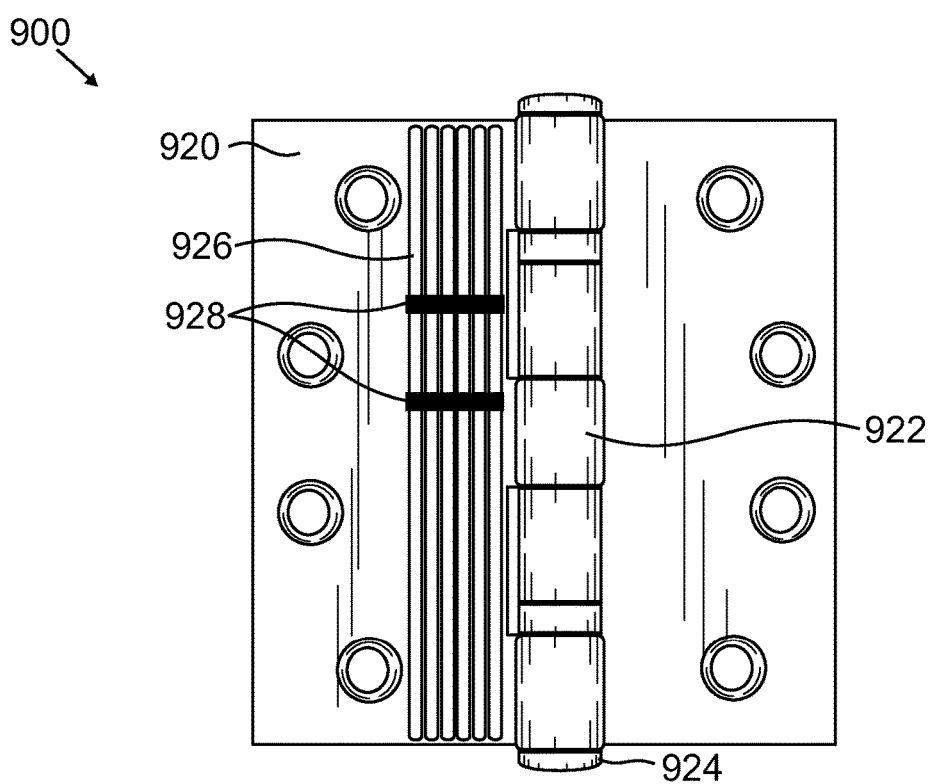

FIG. 9 illustrates a diagram of a reinforced additive manufactured object 900 in accordance with an embodiment of the disclosure. As shown, additive manufactured object 900 may take the form of a hinge, such as a door or cabinet hinge. Further, additive manufactured object 900 may be formed by additive manufacturing apparatus 100A, additive manufacturing system 100B and/or an additive manufacturing process described above in relation to FIGS. 1A through 7. In particular, wing 920, knuckle 922, and/or pin 924 may be formed by structural layers and cross-load members such as those described above. As shown, for example, wing 920 may be formed with structural layers 926 and cross-load members 928. Several other structural layers and cross-load members and corresponding arrangements may be formed to create additive manufactured object 900.

Figure 10:
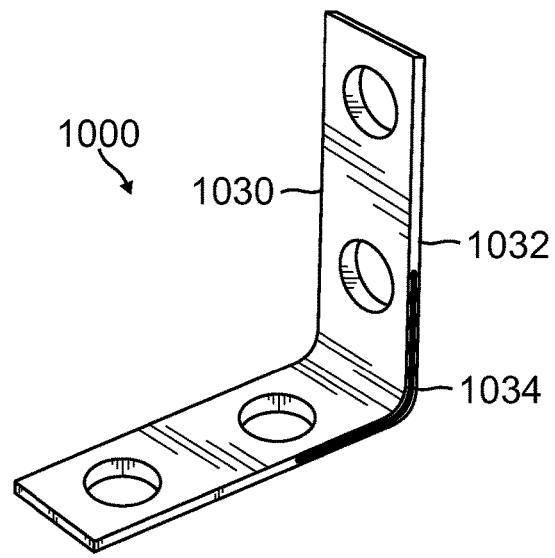

FIG. 10 illustrates a diagram of a reinforced additive manufactured object 1000 in accordance with an embodiment of the disclosure. As shown, additive manufactured object 1000 may take the form of a support or bracket, such as a shelf support or bracket configured to be mounted on one or more surfaces. Further, additive manufactured object 1000 may be formed by additive manufacturing apparatus 100A, additive manufacturing system 100B and/or an additive manufacturing process described above in relation to FIGS. 1A through 7. In particular, plate 1030 may be formed by structural layers and cross-load members such as those described above. As shown, for example, plate 1030 may be formed with structural layers 1032 and cross-load member 1034. Several other structural layers and cross-load members and corresponding arrangements may be formed to create additive manufactured object 1000.

Figure 11:
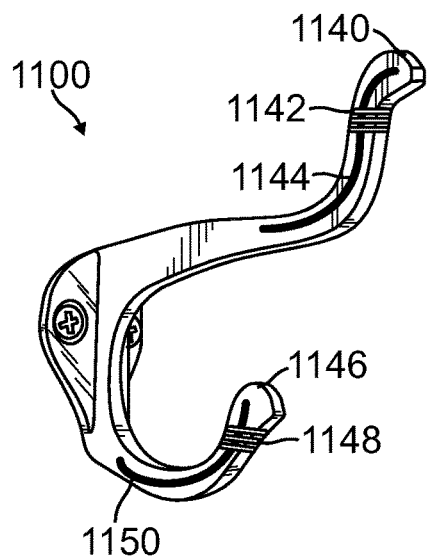

FIG. 11 illustrates a diagram of a reinforced additive manufactured object 1100 in accordance with an embodiment of the disclosure. As shown, additive manufactured object 1100 may take the form of a hook, such as a garment hook. Further, additive manufactured object 1100 may be formed by additive manufacturing apparatus 100A, additive manufacturing system 100B and/or an additive manufacturing process described above in relation to FIGS. 1A through 7. In particular, first hook 1140 and second hook 1146 may be formed by structural layers and cross-load members such as those described above. As shown, for example, first hook 1140 may be formed with structural layers 1142 and cross-load member 1144. Further, second hook 1146 may be formed with structural layers 1148 and cross-load member 1150. Several other structural layers and cross-load members and corresponding arrangements may be formed to create additive manufactured object 1100.

Figure 12:
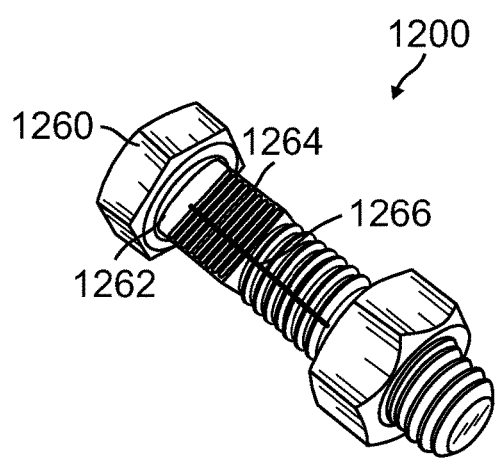

FIG. 12 illustrates a diagram of a reinforced additive manufactured object 1200 in accordance with an embodiment of the disclosure. As shown, additive manufactured object 1200 may take the form of a bolt or a screw. Further, additive manufactured object 1200 may be formed by additive manufacturing apparatus 100A, additive manufacturing system 100B and/or an additive manufacturing process described above in relation to FIGS. 1A through 7. In particular, bolt head 1260 and shaft 1262 may be formed by structural layers and cross-load members such as those described above. As shown, for example, bolt shaft 1262 may be formed with structural layers 1264 and cross-load member 1266. Several other structural layers and cross-load members and corresponding arrangements may be formed to create additive manufactured object 1200.

Figure 13:
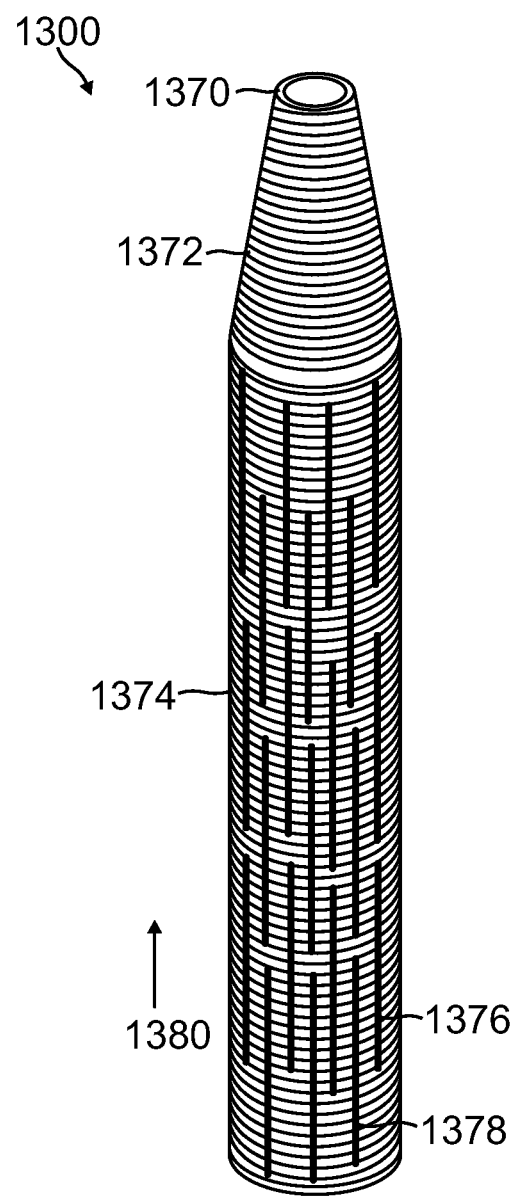

FIG. 13 illustrates a diagram of a reinforced additive manufactured object 1300 in accordance with an embodiment of the disclosure. As shown, additive manufactured object 1300 may take the form of an application nozzle, which may be used to apply caulk and/or other types of pressurized sealing material to joints and/or seams in a structure, such as in an aircraft, an automobile, a home, and/or other structure. In various embodiments, additive manufactured object 1300 may include an opening and/or orifice 1370 that may be circular, among other shapes, sizes, geometries, and/or complexities. Additive manufactured object 1300 may also include substantially conical nozzle tip 1372 and substantially cylindrical nozzle body 1374. In other embodiments, nozzle tip 1372 may be shaped differently, such as to provide structural support for a different shaped orifice 1370. Likewise, nozzle body 1374 may alternatively be rectilinear and/or may include one or more curved lengths and/or elbow segments, for example, in order to facilitate application of a material to a joint or seam with limited access, for example. Additive manufactured object 1300, including each of nozzle body 1374, nozzle tip 1372, and/or orifice 1370 may be formed by additive manufacturing apparatus 100A, additive manufacturing system 100B and/or an additive manufacturing process described above in relation to FIGS. 1A through 7. In particular, nozzle body 1374 and/or nozzle tip 1372 may be formed with reinforcing cross-load members such as those described herein.

For example, nozzle body 1374 may be formed using an additive manufacturing process including a plurality of structural layers (e.g., each including a number of sublayers, which are generally represented in FIG. 13 by horizontal lines) and cross-load members 1376 and 1378. As shown, several structural layers, sublayers, cross-load members, and corresponding arrangements may be formed to create object 1300. In various embodiments, cross-load members 1376 and 1378 may not extend through the entire length of nozzle body 1374 and/or tip 1372, and, in general, the cross-load members may extend through portions of nozzle body 1374 that roughly correspond to borders between designated structural layers of object 1300. As such, the arrangement of cross-load members, including 1376 and 1378, may be configured to strengthen object 1300 against delamination along build direction 1380 (e.g., along the main axis of object 1300), where each sublayer (and thereby each constituent structural layer) is laid upon one another in the direction of build direction 1380. In some instances, the number and/or arrangement of cross-load members may be configured to strengthen and/or stabilize object 1300 to withstand internal pressures of materials being forced through nozzle body 1374 and nozzle tip 1372 and out through orifice 1370. Further, the number and/or arrangement of cross-load members may be configured to prevent lateral and/or sublayer-level anomalies (e.g., due to internal pressures) in sublayer-sublayer joints without full delamination.

As provided in FIGS. 8-13, various reinforced additive manufactured objects may be formed by one or more of additive manufacturing apparatus 100A, additive manufacturing system 100B and/or an additive manufacturing process described above in relation to FIGS. 1A and/or 1B. Yet, it should also be noted that structural layers and/or cross-load members such as those described above may be used to form other objects as well, such as any object that can be formed using an additive manufacturing process, as described herein.

In some embodiments, an additive manufacturing system, such as those described above in relation to FIG. 1A-B, is implemented with additive manufacturing apparatus 100A. System 100B includes logic device 132 configured to control additive manufacturing apparatus 100A to form a first structural layer including a first void that extends partially through the first structural layer. Further, logic device 132 is configured to form a second structural layer including a second void that extends fully through the second structural layer to a border between the first structural layer and the second structural layer, where the first void and the second void align to form a cross-load void across the border between the first and second structural layers. Further, the logic device is configured to fill the cross-load void with a reinforcing material to form a cross-load member. As noted, a thickness of a sub-layer in the first structural layer and/or the second structural layer may range from 0.1 mm to 0.3 mm.

In some embodiments, the additive manufacturing systems described above may include a multi-nozzle design with one or more nozzles, including nozzle 106, for example. As such, the additive manufacturing apparatus may include an extrusion nozzle, possibly with a circular cross-sectional shape, configured to form the first and/or second structural layers. Further, the additive manufacturing apparatus may include a void nozzle (e.g., similar to nozzle 106) configured to fill the cross-load void with the reinforcing material. Thus, the nozzles may be used to form the first and/or second structural layers and/or provide the reinforcing material using one or more of the following materials acrylonitrile butadiene styrene (ABS), polycarbonate (PC), polylactic acid (PLA), high density polyethylene (HDPE), polyphenylsulfone (PPSU), and high impact polystyrene (HIPS). In some embodiments, the first and/or second structural layers may include acrylonitrile butadiene styrene (ABS), and the reinforcing material may include a material with lower viscosity than the ABS.

In some embodiment, the additive manufacturing systems described above may include additive manufacturing apparatus 100A and logic device 132 configured to control the additive manufacturing apparatus 100A. The additive manufacturing system includes means for forming a first structural layer including a first void that extends partially through the first structural layer. The additive manufacturing system includes means for forming a second structural layer including a second void that extends fully through the second structural layer to a border between the first structural layer and the second structural layer, where the first void and the second void align to form a cross-load void across the border between the first and second structural layers. Further, the additive manufacturing system includes means for filling the cross-load void with a reinforcing material to form a cross-load member.

Where applicable, various embodiments provided by the present disclosure can be implemented using hardware, software, or combinations of hardware and software. Also where applicable, the various hardware components and/or software components set forth herein can be combined into composite components including software, hardware, and/or both without departing from the spirit of the present disclosure. Where applicable, the various hardware components and/or software components set forth herein can be separated into sub-components including software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method comprising:
    forming a first structural layer of an additive manufactured object comprising a plurality of first sublayers, the first structural layer comprising a first void that extends partially through the first structural layer;
    forming a second structural layer adjacent to the first structural layer and comprising one or more second sublayers comprising a second void that extends fully through the second structural layer to a border between the first structural layer and the second structural layer, wherein the first void and the second void align to form a cross-load void across the border between the first and second structural layers;
    filling the cross-load void with a reinforcing material to form a cross-load member before proceeding to form a third structural layer; and
    forming the third structural layer.

2. The method of claim 1, wherein:
    the forming the first structural layer comprises forming a third void that extends partially through the first structural layer;
    the forming the second structural layer comprises forming a fourth void that extends partially through the second structural layer and a fifth void that extends fully through the second structural layer;
    the third void and the fifth void align to form a second cross-load void across the border between the first and second structural layers; and
    the method further comprises filling the second cross-load void with the reinforcing material to form a second cross-load member.

3. The method of claim 2, wherein the fourth void is disposed between the second void and the fifth void laterally along the second structural layer.

4. The method of claim 1, further comprising:
    forming additional structural layers adjacent first and/or second structural layers comprising additional sublayers and additional voids to form additional cross-load voids across at least one border between the additional structural layers and/or the first and second structural layers; and
    filling the additional cross-load voids with the reinforcing material to form additional cross-load members across the at least one border between the additional structural layers and/or the first and second structural layers.

5. The method of claim 1, wherein the forming the first structural layer comprises forming a third void, a fourth void, and a fifth void that extend partially through the first structural layer, and wherein a distance between the first void and the third void is greater than a distance between the fourth void and the fifth void.

6. The method of claim 1, wherein:
    the forming the second structural layer comprises forming the second structural layer comprising a sealed cross-load void; and
    the filling the cross-load void comprises preventing the reinforcing material from leaking from the sealed cross-load void.

7. The method of claim 1, wherein the first void and the second void each comprise respective first and second axially curved shapes, wherein the cross-load member is axially curved according to the first and second axially curved shapes, and wherein a placement of the cross-load member is based, at least in part, on one or more expected force vectors associated with the additive manufactured object.

8. The method of claim 1, wherein the first structural layer and the second structural layer form at least a portion of a fused filament fabrication (FFF) object.

9. A system to perform the method of claim 1, the system comprising:
    an additive manufacturing apparatus; and
    a logic device configured to control the additive manufacturing apparatus to:
        form the first structural layer comprising the plurality of first sublayers comprising the first void that extends partially through the first structural layer;

form the second structural layer adjacent to the first structural layer and comprising the one or more second sublayers comprising the second void that extends fully through the second structural layer to the border between the first structural layer and the second structural layer, wherein the first void and the second void align to form the cross-load void across the border between the first and second structural layers;

fill the cross-load void with the reinforcing material to form the cross-load member before proceeding to form the third structural layer; and form the third structural layer;

wherein the additive manufacturing apparatus comprises an extrusion nozzle configured to form the first and/or second structural layers.

10. The system of claim 9, wherein the additive manufacturing apparatus comprises a void nozzle configured to fill the cross-load void with the reinforcing material.

11. The system of claim 9, wherein the first and/or second structural layers and/or the reinforcing material comprises at least one of acrylonitrile butadiene styrene (ABS), polycarbonate (PC), polylactic acid (PLA), high density polyethylene (HDPE), polyphenylsulfone (PPSU), and high impact polystyrene (HIPS).

12. The system of claim 11, wherein the first and/or second structural layers comprises acrylonitrile butadiene styrene (ABS), and wherein the reinforcing material comprises a material with higher cured strength than the ABS.

13. The system of claim 9, wherein a thickness of each of the plurality of first sublayers of the first structural layer and/or each of the one or more second sublayers of the second structural layer ranges from 0.1 mm to 0.3 mm.

14. The system of claim 9, wherein the first structural layer and the second structural layer form at least a portion of an application nozzle.

15. The method of claim 1, further comprising:
receiving a command to form the additive manufactured object, wherein the command comprises one or more expected force vectors associated with the additive manufactured object;
determining a placement for the cross-load member to be formed within at least the first and second structural layers of the additive manufactured object based, at least in part, on the one or more expected force vectors;
determining one or more characteristics for the first structural layer comprising the plurality of first sublayers of the additive manufactured object based, at least in part, on the one or more expected force vectors; and
determining one or more characteristics for the second structural layer comprising the one or more second sublayers of the additive manufactured object based, at least in part, on the one or more expected force vectors.

16. The method of claim 15, wherein the command to form the additive manufactured object indicates a shape, height, length, width, and/or another physical characteristic of the additive manufactured object, the method further comprising selecting the reinforcing material to fill the cross-load void and form the cross-load member based, at least in part, on the shape, height, length, width, and/or another physical characteristic of the additive manufactured object.

17. The method of claim 15, wherein:
the receiving the command to form the additive manufactured object comprises receiving the one or more expected force vectors associated with the additive manufactured object; and
the determining the first and second structural layers of the additive manufactured object comprises determining locations in the first and second structural layers to form the first void and the second void based, at least in part, on the one or more expected force vectors.

18. The method of claim 15, wherein:
the receiving the command to form the additive manufactured object comprises receiving the one or more expected force vectors associated with the additive manufactured object; and
the method further comprises determining a depth, a height, a thickness, a shape, and/or a width of the first and/or second voids based, at least in part, on the one or more expected force vectors.

19. The method of claim 15, wherein the receiving the command to form the additive manufactured object comprises receiving the one or more expected force vectors associated with the additive manufactured object, the method further comprising:
selecting a first material to form the first and second structural layers based, at least in part, on the one or more expected force vectors; and
selecting a second material to fill the cross-load void based, at least in part, on a viscosity of the second material.

20. The method of claim 15, wherein the additive manufactured object comprises a fused filament fabrication (FFF) object, and wherein the method further comprises:
determining one or more susceptible portions of the FFF object, wherein the determining the first and/or second structural layers of the FFF object comprises determining locations in the first and/or second structural layers to form the first and/or second voids based, at least in part, on the one or more susceptible portions.

* * * * *